US011455325B2

(12) United States Patent
Lee

(10) Patent No.: US 11,455,325 B2
(45) Date of Patent: Sep. 27, 2022

(54) SYSTEM AND METHOD FOR DIALOGUE BASED FILE INDEX

(71) Applicant: Samsung Electronics Co., Ltd., Suwon-si (KR)

(72) Inventor: Sung Hyuck Lee, Menlo Park, CA (US)

(73) Assignee: Samsung Electronics, Co., Ltd., Suwon-si (KR)

( * ) Notice: Subject to any disclaimer, the term of this patent is extended or adjusted under 35 U.S.C. 154(b) by 0 days.

(21) Appl. No.: 16/547,526

(22) Filed: Aug. 21, 2019

(65) Prior Publication Data

US 2020/0065320 A1    Feb. 27, 2020

Related U.S. Application Data

(60) Provisional application No. 62/721,440, filed on Aug. 22, 2018.

(51) Int. Cl.
| | |
|---|---|
| *G06F 16/33* | (2019.01) |
| *G06F 16/31* | (2019.01) |
| *G06F 16/14* | (2019.01) |
| *G06F 16/332* | (2019.01) |
| *G06F 16/335* | (2019.01) |

(52) U.S. Cl.
CPC ........ *G06F 16/3329* (2019.01); *G06F 16/148* (2019.01); *G06F 16/31* (2019.01); *G06F 16/335* (2019.01); *G06F 16/3334* (2019.01); *G06F 16/3335* (2019.01)

(58) Field of Classification Search
None
See application file for complete search history.

(56) References Cited

U.S. PATENT DOCUMENTS

| | | | |
|---|---|---|---|
| 8,650,159 B1* | 2/2014 | Zhang | G06F 16/1748 |
| | | | 707/664 |
| 2003/0009495 A1* | 1/2003 | Adjaoute | G06F 16/3329 |
| 2004/0243627 A1* | 12/2004 | Jensen | G06F 16/951 |
| 2005/0027708 A1* | 2/2005 | Mueller | G06F 16/256 |

(Continued)

FOREIGN PATENT DOCUMENTS

| | | |
|---|---|---|
| JP | 2012-083929 A | 4/2012 |
| KR | 10-2010-0040024 A | 4/2010 |

(Continued)

OTHER PUBLICATIONS

ISA/KR, International Search Report and Written Opinion of the International Searching Authority, International Application No. PCT/KR2019/010721, dated Nov. 28, 2019, 8 pages.

(Continued)

*Primary Examiner* — Son T Hoang

(57) ABSTRACT

An intelligent assistant device for conversation-based indexing and searching of a file. The intelligent assistant device having a processor configured to detect a conversation having at least one user. The processor, responsive to detecting the conversation having at least one user configured to mine the conversation for a file associated with the conversation. The processor, responsive to identifying the file further configured to mine the conversation for contextual keywords associated with the file. The processor also configured to index the contextual keywords to the file.

20 Claims, 13 Drawing Sheets

(56) References Cited

U.S. PATENT DOCUMENTS

| | | | |
|---|---|---|---|
| 2005/0283475 A1* | 12/2005 | Beranek | G06F 16/3334 |
| 2007/0239697 A1 | 10/2007 | Chen et al. | |
| 2011/0055295 A1 | 3/2011 | Bhide et al. | |
| 2012/0084291 A1* | 4/2012 | Chung | G06F 16/14 |
| | | | 707/741 |
| 2012/0215786 A1* | 8/2012 | Abbott | G06F 16/22 |
| | | | 707/741 |
| 2012/0233160 A1 | 9/2012 | Koomullil et al. | |
| 2013/0159003 A1 | 6/2013 | Kim et al. | |
| 2013/0159361 A1 | 6/2013 | Maag et al. | |
| 2014/0188830 A1* | 7/2014 | deVille | G06F 16/355 |
| | | | 707/706 |
| 2014/0214850 A1 | 7/2014 | Liang et al. | |
| 2014/0236958 A1 | 8/2014 | Vaughn | |
| 2014/0280602 A1* | 9/2014 | Quatrano | G06F 16/3329 |
| 2016/0259778 A1* | 9/2016 | Cookson | G06F 16/31 |
| 2018/0011868 A1* | 1/2018 | Allen | G06F 16/168 |
| 2018/0089241 A1 | 3/2018 | Mendels et al. | |

FOREIGN PATENT DOCUMENTS

| | | |
|---|---|---|
| KR | 20120003834 | 6/2012 |
| KR | 20180068113 A | 6/2018 |

OTHER PUBLICATIONS

Supplementary European Search Report dated May 12, 2021 in connection with European Patent Application No. EP 19 85 1712, 6 pages.

* cited by examiner

SYSTEM AND METHOD FOR DIALOGUE BASED FILE INDEX

CROSS-REFERENCE TO RELATED APPLICATION AND CLAIM OF PRIORITY

This application claims priority under 35 U.S.C. § 119(e) to U.S. Provisional Patent Application No. 62/721,440 filed on Aug. 22, 2018. The above-identified provisional patent application is hereby incorporated by reference in its entirety.

TECHNICAL FIELD

This disclosure relates generally to an electronic device with an intelligent assistant capability, and more particularly, to a system and method of dialogue based file indexing.

BACKGROUND

File indexing and retrieval is becoming increasingly difficult in traditional file management systems, even in a controlled work environment, as the number of files and the number of users interacting with these files increases. In addition, updates or different versions of these files can also exist in a file management system. Adding to the difficulty is that people generally find it easier to recall a file based on the specific content of the file in the context of interactions with other users, rather than by a file index label assigned to the file. However, file indexing and retrieval in traditional file management systems continues to be mainly a manual process based on traditional file index labels.

The alternatives to manually indexing and retrieving files based on a file index label also have limitations. In traditional search platforms, the stored files, documents, images, audio, video and the like have only limited file metadata such as, physical location, file creation time, and the like, and the systems can only use content keywords for indexing and searching. Solutions are needed for file indexing and retrieval.

SUMMARY

In contrast, to the traditional search platforms a system and method based on utilizing the mining of contextual keywords from conversational interactions associated with these interactions, and the subsequent mining of query keywords from conversational interactions associated with an intent to retrieve an indexed file, for the purpose of suggesting files having indexes matching the mined query keywords, is a better alternative to these traditional search platforms of one or more users to assist with the indexing of a file. Embodiments of the present disclosure are provided below:

In certain embodiments, an apparatus for conversation-based indexing and searching of a file is provided. The apparatus includes a processor configured to detect a conversation having at least one user. The processor, responsive to detecting the conversation having at least one user configured to mine the conversation for a file associated with the conversation. The processor, responsive to identifying the file further configured to mine the conversation for contextual keywords associated with the file. The processor also configured to index the contextual keywords to the file.

In certain embodiments, a method for file indexing with an intelligent assistant device is provided. The method includes detecting a conversation having a least one user. Responsive to detecting the conversation having at least one user, the method further includes monitoring the conversation for a file associated with the conversation. Responsive to identifying the file, the method further includes mining the conversation for contextual keywords associated with the file. The method also includes indexing the contextual keywords to the file.

In certain embodiments, a computer program product residing on a non-transitory computer-readable storage medium having a plurality of instructions stored thereon, which, when executed by a processor, cause the processor to detect a conversation having at least one user. Responsive to detecting the conversation having at least one user, the computer program product further causes the processor to monitor the conversation for a file associated with the conversation. Responsive to identifying the file, the user computer product further causes the processor to mine the conversation for contextual keywords associated with the file. The computer program product also causes the processor to index the contextual keywords to the file.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The terms as used herein are provided merely to describe some embodiments thereof, but not to limit the scope of other embodiments of the present disclosure. It is to be understood that the singular forms of "a," "an," and "the" include plural references unless the context clearly dictates otherwise. All terms including technical terms and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
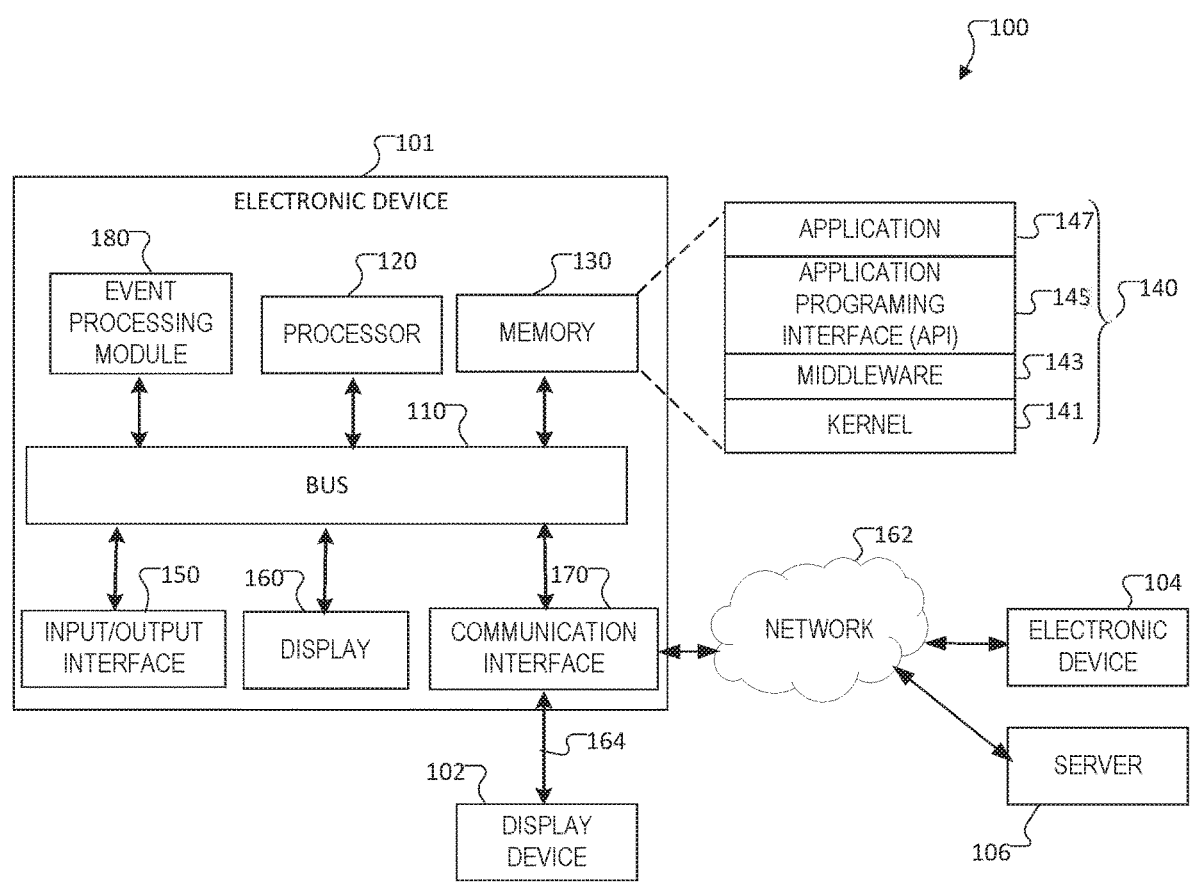
FIG. 1 illustrates an example electronic device in a network environment according to embodiments of the present disclosure.

FIG. 1 through FIG. 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments, of the present disclosure provide for an intelligent assistant device for conversation-based indexing and searching of a file. The intelligent assistant device having a processor configured to detect a conversation having at least one user. The processor, responsive to detecting the conversation having at least one user configured to mine the conversation for at least one contextual keyword associated with the file. The processor further configured to index the at least one contextual keyword to the file.

Examples of the electronic device according to embodiments of the present invention may include at least one of a smart speaker, a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (for example, smart glasses, a head-mounted device (HMD), electronic clothes, an electronic bracelet, an electronic necklace, an electronic accessory, an electronic tattoo, a smart mirror, or smart watch.)

According to certain embodiments of the present disclosure, the electronic device may be a smart home appliance. Examples of the smart home appliance may include at least one television, a digital video disk (DVD), an audio player, a refrigerator, an air conditioner, a cleaner, an oven a microwave oven, a washer, a drier, an air cleaner, a set-top box, a home automation control panel, a security control panel, a TV box (for example, Samsung HomeSync, Apple TV, or Google TV) a gaming console (Xbox, PlayStation) an electronic dictionary, an electronic key, a camcorder, or an electronic picture frame.

According to an embodiment of the present invention, examples of the electronic device may include at least one of various medical devices (for example, diverse portable medical measuring devices sugar measuring device, (a blood sugar measuring device, a heartbeat measuring device, a body temperature measuring device), a magnetic resource angiography (MRA) device, a magnetic resource (MRI) device, a computer tomography (CT) device, an imaging device, or an ultrasonic device,) a navigation device, a global positioning system (GPS) receiver, an event data recorder (EDR), a flight data recorder (FDR), an automotive infotainment device, a sailing electronic device (for example, a sailing navigation device or a gyro compass), avionics security devices, vehicular head units, industrial or home robots, automatic teller's machines (ATMs), point of sales (POS) devices, or Internet of Things devices (for example, a bulb various sensors, electric or gas meter, a sprinkler, a fire alarm, a thermostat, a street light, a toaster, fitness equipment, a hot water tank, a heater, or a boiler.)

According to various embodiments of the disclosure, examples of the electronic device at least include one of: a piece of furniture or building/structure, an electronic board, an electronic signature receiving device, a projector, or various measurement devices (for example devices for measuring water, electricity, gas, or electromagnetic waves).

According to an embodiment of the present disclosure, the electronic device may be one or a combination of the above-listed devices. According to an embodiment of the present disclosure, the electronic device may be a flexible electronic device. The electronic device disclosed herein is not limited to the above listed devices and may include new electronic devices depending on the development of technology.

Hereinafter, electronic devices are described with reference to the accompanying drawings, according to various embodiments of the present disclosure. As used herein, the term "user" is able to denote a human or another device (for example, an intelligent electronic device) using the electronic device.

FIG. 1 illustrates an example electronic device in a network environment 100 according to embodiments of the present disclosure. The embodiment of the electronic device 101 and the network environment 100 shown in FIG. 1 is for illustration only. Other embodiments of the electronic device 101 and network environment 100 could be used without departing from the scope of this disclosure.

According to an embodiment of the present disclosure, an electronic device 101 is included in a network environment 100. The electronic device can be coupled to a display device 102. The electronic device 101 can include at least one of a bus 110, a processor 120, a memory 130, an input/output (10) interface 150, a display 160, a communication interface 170, or an event processing module 180. In some embodiments, the electronic device 101 can exclude at least one of the components or can add another component.

The bus 110 includes a circuit for connecting the processor 120 to event processing module 180 with one another and transferring communications (e.g., control messages and/or data) between the components.

The processor 120 includes one or more of a Central Processing Unit (CPU), an Application Processor (AP), or a Communication Processor (CP). The processor 120 is able to perform control on at least one of the other components of the electronic device 101, and/or perform an operation or data processing relating to communication.

As used herein, the terms "configured (or set) to" may be independently used with the terms "suitable for," "having the capacity to," "designed to," "adapted to," "made to," or "capable of" depending on circumstances. The term, "configured (or set) to" does not mean "specifically designed in hardware to." Rather, the term "configured to" may mean that a device can perform an operation together with another device.

For example, the term "processor configured (or set) to perform A, B, and C" may mean a generic purpose processor (for example, a CPU or application processor) that is able to perform the operations by executing one or more software programs stored in a memory device or a dedicated processor (for example an embedded processor) for performing the operations.

The memory 130 can include a volatile and/or non-volatile memory. For example, the memory 130 can store commands or data related to at least one other component of the electronic device 101. According to an embodiment of the present disclosure, the memory 130 stores software and/or a program 140. The program 140 includes, e.g., a kernel 141, middleware 143, an Application Programming Interface (API) 145, and/or an application program (or "application") 147. At least a portion of the kernel 141, middleware 143, or API 145 can be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources.

The middleware 143 can function as a relay to allow the API 145 or the application 147 to communicate data with the kernel 141, for example. A plurality of applications 147 can be provided. The middleware 143 is able to control work requests received from the applications 147, e.g., by allocating the priority of using the system resources of the electronic device 101 (e.g., the bus 110, the processor 120, or the memory 130) to at least one of the plurality of applications 147.

The API 145 is an interface allowing the application 147 to control functions provided from the kernel 141 or the middleware 143. For example, the API 145 includes at least one interface or function (e.g., a command) for filing control, window control, image processing, or text control.

The input/output interface 150 serves as an interface that can, e.g., transfer commands or data input from a user or other external devices to other component(s) of the electronic device 101. Further, the IO interface 150 can output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 is able to display, e.g., various contents (e.g., text, images, videos, icons, or symbols) to the user. The display 160 can include a touchscreen and is able to receive, e.g., a touch, gesture, proximity or hovering input using an electronic pen or a body portion of the user.

For example, the communication interface 170 is able to set up communication between the electronic device 101 and an external electronic device (e.g., a display device 102, a second external electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as video feeds or video streams. Additionally, the communication interface 170 can include a near field communication capability to perform a near field communication directly with another device, such as display device 102. For example, communication interface 170 can include a BLUETOOTH transceiver, a ZIGBEE transceiver, a WI-FI transceiver, and the like, a magnetic connection, or an optical communication. In certain embodiments, the display device 102 is coupled to the electronic device via a wired or wireline connection.

Electronic device 101 further includes one or more sensors that can meter a physical quantity or detect an activation state of the electronic device 101 and convert metered or detected information into an electrical signal. For example, the sensors can include one or more buttons for touch input, a camera, a gesture sensor, a gyroscope or gyro sensor, an air pressure sensor, a magnetic sensor or magnetometer, an acceleration sensor or accelerometer, a depth or distance sensor, a grip sensor, a proximity sensor, a color sensor (e.g., a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared sensor (IR) sensor, an ultrasound sensor, an iris sensor, a fingerprint sensor, and the like. The sensor(s) can further include a control circuit for controlling at least one of the sensors included therein. Any of these sensor(s) can be located within the electronic device 101. A camera sensor can capture a plurality of frames for a single image to be combined by the processor 120.

The display device 102 or the second external electronic device 104 may be a wearable device or an electronic device 101-mountable wearable device (e.g., an optical head mounted display (HMD)) is provided. When the electronic device 101 is mounted in the HMD, the electronic device 101 detects the mounting in the HMD and operates as a display device 102, such as in an augmented reality mode. In certain embodiments, the electronic device 101 detects the mounting in the HMD and operate in an augmented reality mode. When the electronic device 101 is mounted in the HMD, the electronic device 101 communicates with the HMD through the communication interface 170. The electronic device 101 can be directly connected with the HMD to communicate with the HMD without involving a separate network.

The wireless communication is able to use a wireless communication medium, such as at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks. Examples of communication include a computer network (e.g., local area network (LAN) or wide area network (WAN)), Internet, or a telephone network.

The external electronic device 104 and server 106 each can be a device of the same or a different type from the electronic device 101. According to certain embodiments of the present disclosure, the server 106 includes a group of one or more servers. According to certain embodiments of the present disclosure, all or some of operations executed on the electronic device 101 can be executed on another or multiple other electronic devices (e.g., the external electronic device 104 or server 106). According to certain embodiments of the present disclosure, when the electronic device 101 should perform some function or service automatically or at a request, the electronic device 101, instead of executing the function or service on its own or additionally, can request another device (e.g., external electronic device 104 or server 106) to perform at least some functions associated therewith. The other electronic device (e.g., external electronic device 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique can be used, for example.

Although FIG. 1 shows that the electronic device 101 includes the communication interface 170 to communicate with the external electronic device 104 or server 106 via the network 162, the electronic device 101 can be independently operated without a separate communication function, according to an embodiment of the present disclosure.

The server 106 can support to drive the electronic device 101 by performing at least one of operations (or functions) implemented on the electronic device 101. For example, the server 106 can include a processing module or processor that is able to support the processor 120 implemented in the electronic device 101.

For example, the electronic device 101 can include an event processing module 180, such as within processor 120. The event processing module 180 can process at least part of information obtained from other elements (e.g., the processor 120, the memory 130, the input/output interface 150, or the communication interface 170) and can provide the same to the user in various manners. The server event processing module can include at least one of the components of the event processing module 180 and perform (or instead perform) at least one of the operations (or functions) conducted by the event processing module.

For example, according to an embodiment of the present disclosure, the event processing module 180 processes information related to an event, which is generated while the electronic device 101 is mounted in a wearable device (e.g., as the display device 102) to function as a display apparatus and to operate in the augmented reality mode, to fit the augmented reality mode and display the processed information. When the event generated while operating in the augmented reality mode is an event related to running an application, the event processing module can block the running of the application or process the application to operate as a background application or process.

The event processing module 180 can be separate from the processor 120 or at least a portion of the event processing module can be included or implemented in the processor 120 or at least one other module, or the overall function of the event processing module 180 can be included or implemented in the processor 120 shown or another processor. The event processing module can perform operations according to embodiments of the present disclosure in interoperation with at least one program 140 stored in the memory 130.

In some embodiments, an intelligent assistant device may perform various aspects for a conversation-based file index and search. One function the intelligent assistant device may perform is a conversation catch which analyzes the content of the conversations (either text or speech) of one or more users, identifies keywords on how users interact with each other through conversation mining. Another function may be to index, or mark updated files or related links with the identified keywords. The intelligent assistant device may then perform intention detection on subsequent conversations to detect intended queries for a files search based on conversation mining, then searches for files or links queried with the dialogue content. The resulting information may then be provided by way of a suggestion in response to the query.

Figure 2:
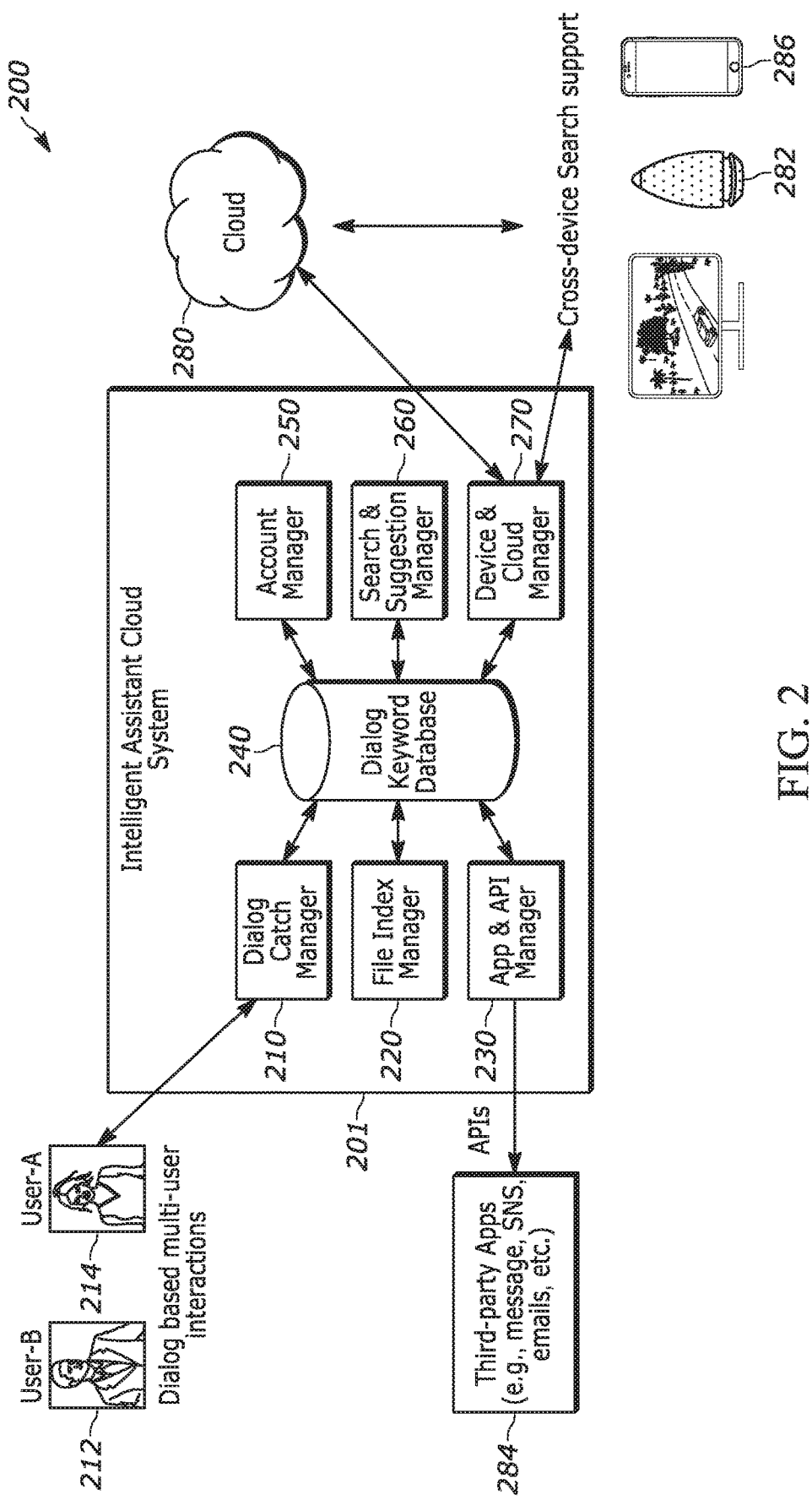
FIG. 2 illustrates an example of a dialog-based file index and search architecture for a file management system according to embodiments of the present disclosure.

FIG. 2 illustrates an example of a conversation-based file index and search architecture for a file management system according to embodiments of the present disclosure. The embodiment of the conversation-based file index and search architecture for a file management system 200 illustrated in FIG. 2 is for illustration only. Other embodiments of the conversation-based file index and search architecture for a file management system could be used without departing from the scope of this disclosure.

According to an embodiment of the present disclosure, the file management system 200 can be implemented by the processor 120 on a cloud system or device, such that it is an intelligent assistant system 201. The intelligent assistant can be a virtual digital assistant, a personal voice assistant, and the like. For example, the intelligent assistant system 201 can be a personal intelligent assistant, such as BIXBY, SIRI, CORTANA, ALEXA, and the like, operating on a smart system or device.

In some embodiments, the intelligent assistant system 201 includes a Dialog Catch Manager. In certain embodiments, the Dialog Catch Manager 210 is capable of monitoring conversations between one or more users. That is, the Dialog Catch Manager 210 is capable of monitoring multi-user, conversation-based, interactions. For example, the Dialog Catch Manager 210 can monitor a conversation between a single or user-A 212 and the intelligent assistant system 201. In another example, the Dialog Catch Manager 210 can monitor a conversation between a user-A 212 and a user-B 214 or a plurality of users. These conversations can be of different types and formats. For example, the conversations can be debate, dialogue, discourse, diatribe, one-way, two-way, textual, and the like. In certain embodiments, the Dialog Catch Manager 210 is able to detect the start of a conversation.

In some embodiments, the Dialog Catch Manager 210 is able to detect the context of a conversation between one or more users. In certain embodiments, the Dialog Catch Manager 210 is capable of understanding the context of the conversation. That is, the Dialog Catch Manager 210 is able to determine the circumstances that form the setting for the conversation. In certain embodiments, the Dialog Catch Manager 210 is able to perceive how users interact with each other to specific content, such as documents, multimedia files, web content, and the like in the conversation. In certain embodiments, the Dialog Catch Manager 210 is able to perceive basic user emotions, such as like, dislike, anger, disgust, fear, happiness, sadness, contempt, surprise, contempt, and the like, to content in the conversation.

In some embodiments, the Dialog Catch Manager 210 is capable of mining contextual keywords relating to the circumstances of the conversation between one or more users about the content. In certain embodiments, the Dialog Catch Manager 210 is capable of mining conversations between users for keywords related to the users. For example, the Dialog Catch Manager 210 can mine the identity of the users and their account information from the conversation. In certain embodiments, the Dialog Catch Manager 210 is capable of mining conversations between users for keywords related to the content. For example, the Dialog Catch Manager 210 can mine the file name, the file format, Uniform Resource Locator (URL) links, and the like, that are used or posted in the conversation. In certain embodiments, the Dialog Catch Manager 210 is capable of mining the conversation between the users for keywords related to the content metadata. For example, the Dialog Catch Manager 210 can mine a timestamp, date and time, associated with when a certain event occurred, such as, when the conversation occurred, when a file was posted, when a file was uploaded, and the like. In certain embodiments, the Dialog Catch Manager 210 is capable of mining the conversation between the users for keywords related to dialogue keywords related to the content. In certain embodiments, the dialogue keywords are determined, based in part, on a word frequency. In certain embodiments, the Dialog Catch Manager 210 is capable of mining the conversation between the users for keywords related to category or class that the content or conversation is regarded as belonging to. For example, the Dialog Catch Manager 210 can mine a category, genres, or class, such as, work, private, entertainment, rock, chat, messaging, SNS channel names, and the like. In certain embodiments, the Dialog Catch Manager 210 is capable of mining the conversation between the users for keywords related to a user's preference for a specific file or content. For example, the Dialog Catch Manager 210 can mine the conversation for keywords indicating a user's preference for one song from a playlist over another song(s). That is, language showing a user likes a song or dislikes another song or genre. As described herein, the Dialog Catch Manager 210 is capable of mining a conversation for contextual keyword(s) related to the circumstances that form the setting of a conversation about a file or content. In some embodiments, the Dialog Catch Manager 210 is capable of updating keywords for a file based on file updates and future conversations about re-uploaded files.

In conversations between a single user-A 212 and the intelligent assistant system 201 the keywords mined by the Dialog Catch Manager 210 will mostly be related to the user's specific requests or related to a particular task the user has request that the intelligent assistant system 201 to perform, In this instance the Dialog Catch Manager 210 can determine the user's preference to content. For example, the Dialog Catch Manager 210 can identify the user's preference for a song or music genre if the user requests that the intelligent assistant system 201 plays a particular song belonging to a specific genre. In some embodiments, the Dialog Catch Manager 210 is able to use the users' preference as part of the conversation keywords used for indexing the file.

In some embodiments, the Dialog Catch Manager 210 is capable of downloading a specific file or content from a database. For example, the Dialog Catch Manager 210 can download the specific file from proprietary applications or third-party applications, such as, message, Social Network Service (SNS), emails, and the like, using an interface with an API Manager.

In some embodiments, the Dialog Catch Manager 210 monitors conversations by default to which the intelligent assistant system 201 is a party, on the presumption that user(s) have given it permission to do so unless otherwise instructed not to do so. In some embodiments, the Dialog Catch Manager 210 is capable of asking for permission to monitor the conversation.

In some embodiments, the intelligent assistant system 201 includes an Account Manager. In certain embodiments, the Account Manager 250 contains the registered user account information of users on chat, SNS, and messaging services and the like. In certain embodiments, the Dialog Catch Manager 210 is able to communicate with the Account Manager 250 for the purpose of mining keywords associated with the registered user accounts of users involved in a conversation.

In some embodiments, the intelligent assistant system 201 includes a File Index Manager. In certain embodiments, the File Index Manager 220 is capable of indexing a file, content, and the like, from a conversation between one or more users, with keywords that have been mined by the Dialog Catch Manager 210. As described herein, an index, is a computer index created with the file that allows easy access to any file given the files unique index. In some instances, a file can have more than one index. These other indexes may be referred to as alternative indexes. In certain embodiments, the File Index Manager 220 indexes a file that has been newly posted to a conversation, or re-uploaded to a new conversation, by the Dialog Catch Manager 210.

In some embodiments, the File Index Manager 220 stores the file index to a database. In certain embodiments, the database is a Dialog Keyword Database 240 as shown in FIG. 2. In certain embodiments, the Dialog Keyword Database 240 can be a cloud database. For example, the Dialog Keyword Database can be a cloud database 280, for example the intelligent assistant cloud, or a third-party cloud database.

In some embodiments, the File Index Manager 220 is able to index the file with a keyword phrase that has been mined from a conversation between one or more uses by the Dialog Catch Manager 210. In certain embodiments, the File Index Manager 220 is able to index the file with a plurality of keywords or a plurality of plurality of phrases. In certain embodiments, the plurality of keywords or the plurality of phrases have been mined by the Dialog Catch Manager 210 from different users. In certain embodiments, the File Index Manager 220 creates the index in response to the file being posted in a database.

In some embodiments, the File Index Manager 220 is able to update the file index with content keywords mined from file updates or contextual keywords mined from other conversations about a re-uploaded file. In certain embodiments, the File Index Manager 220 is able to update the index with metadata updates for the file. As used herein, metadata is data that makes finding and working with a file easier. For example, the metadata can include the author of the file, the date that the file was created, the date that the file was modified, the size of the file, and the like. That is, the index information for a file is continually update according to users' future interactions with the file.

In some embodiments, the intelligent assistant system 201 includes a Search and Suggestion Manager 260. In certain embodiments, the Search and Suggestion Manager 260 monitors conversations between one or more users. In certain embodiments, the Search and Suggestion Manager 260 identifies a query for a file by mining the conversation for keywords associated with a query from a user-B 212 for a file. The query can be associated with a direct request for a file from a user-B 212 or an indirect request for the file from the user-B 212. For example, if a user-B 212 asks a user-A 214 in a conversation for a file the Search and Suggestion Manager 260 detects the file query based on query keywords mined from the conversation even though the user-B 212 did not directly ask the intelligent assistant system 201 for the file. In some embodiments, the Search and Suggestion Manager 260 is able to detect a query for a file based on whether the file has been uploaded to the Dialog Catch Manager 210. As such, the Search and Suggestion Manager 260 detects the query for the file, even though a user-B 212 or user-A 214 has not directly asked the intelligent assistant system 201 for the file. In certain embodiments, the Search and Suggestion Manager 260 is able to identify a request for a file based on a direct request for the file from a user-B 212. For example, a user-B 212 can ask the intelligent assistant system 201 to locate a file.

Having identified a query for a file, either indirectly or directly, the Search and Suggestion Manager 260 is able to perform a keyword search of the file index database, which in certain embodiments is the Dialog Keyword Database 240, for a file index matching the query keywords. The Search and Suggestion Manager 260 is able to identify one or more file indexes matching the mined query keywords. In certain embodiments, the Search and Suggestion Manager 260 is able to suggest a single file for consideration. For example, the single file can be the only file having a file index matching the mined query keywords. In certain embodiments, the file can be a candidate file from among a plurality of files having indexes matching the mined query keywords. For example, the candidate file can be the best fit file from the plurality of files having indexes matching the mined query keywords and the Search and Suggestion Manager 260 lists the best fit for consideration by the user-B 212 making the file query. In certain embodiments, there are a plurality of candidate files, and the Search and Suggestion Manager 260 is able to list the plurality of candidate files for consideration by the user-B 212 making the file query. That is, the user-B 212 making the file query identifies the file matching the query from among the plurality of listed candidate files matching the mined query keywords.

In some embodiments, the intelligent assistant system 201 includes an Application and Application Programming Interface (API) Manager. In certain embodiments, the API Manager 230 allows the intelligent assistant system 201 to interface to Samsung applications and third-party applications, such as, message, Social Network Service (SNS), emails, and the like. In certain embodiments, the API Manager 230 can include a dialogue-based file index and search related API. The dialogue-based file index and search related API allows the intelligent assistant system 201 to the search and index files in third-party applications. That is, the Search and Suggestion Manager 260 of the intelligent assistant system 201 is able to search third-party applications for files using mined keywords and the File Index Manager 220 of the intelligent assistant device is able to index these files using keywords. Over time, this will dramatically reduce the processing load on the intelligent assistant system 201 associated with the searching of third-party applications by the Search and Suggestion Manager 260 and the indexing of the files on these third-party applications by the File Index Manager 220. Because, more and more, file indexes will be maintained in the Dialog Keyword Database 240 of a cloud server.

In some embodiments, the intelligent assistant system 201 includes a Device and Cloud Manager. In certain embodiments, the Device and Cloud Manager 270 is able to interface to the cloud database 280 and third-party clouds. As described herein, the cloud can be a Wide Area Network (WAN) like the public internet capable of storing large amounts of data. In certain embodiments, the Device and Cloud Manager 270 is able to interface to physical devices, such as local devices 282. In certain embodiments, the content of the indexed files on third-party applications can be download and stored in a database of the local device 282. In certain embodiments, the downloaded content may be stored on a local device 282 of a user-B 212 who has requested a file in conversation. In certain embodiments, the Device and Cloud Manager 270 is able to store the existing file metadata index to the downloaded file in the Dialog Keyword Database 240. In certain embodiments, the file index in the Dialog Keyword Database 240 can include the local device 282 storage information to identify the content in the locally stored machine. For example, the local device name, the local device type, the local content owner, the local storage path, the local download time and the like.

In some embodiments, the Search and Suggestion Manager 260 of the intelligent assistant system 201 is able to search the local device 282 for files using keywords and the File Index Manager 220 of the intelligent assistant system 201 is able to index these local files using keywords. In some embodiments, the local device 282 forms part of local database and the local database is a cross device database. For example, the local device 282 may be a first local device and the first local device can be one of a plurality of local device databases. In some embodiments, the query for the file can originated from a second local device and the file can be stored on a first local device. In some embodiments, the contents of a file identified by the Search and Suggestion Manager 260 is able to be download from the first local device and stored in the second local device 282 and the File Index Manager 220 is able to update the file index on the cloud server with the local storage information of the second local device. That is, the system supports the conversation-base file search across local devices because while the content of the file is stored on a local device 282 the index of the file is maintained in the Dialog Keyword Database 240 of a cloud server.

Figure 3:
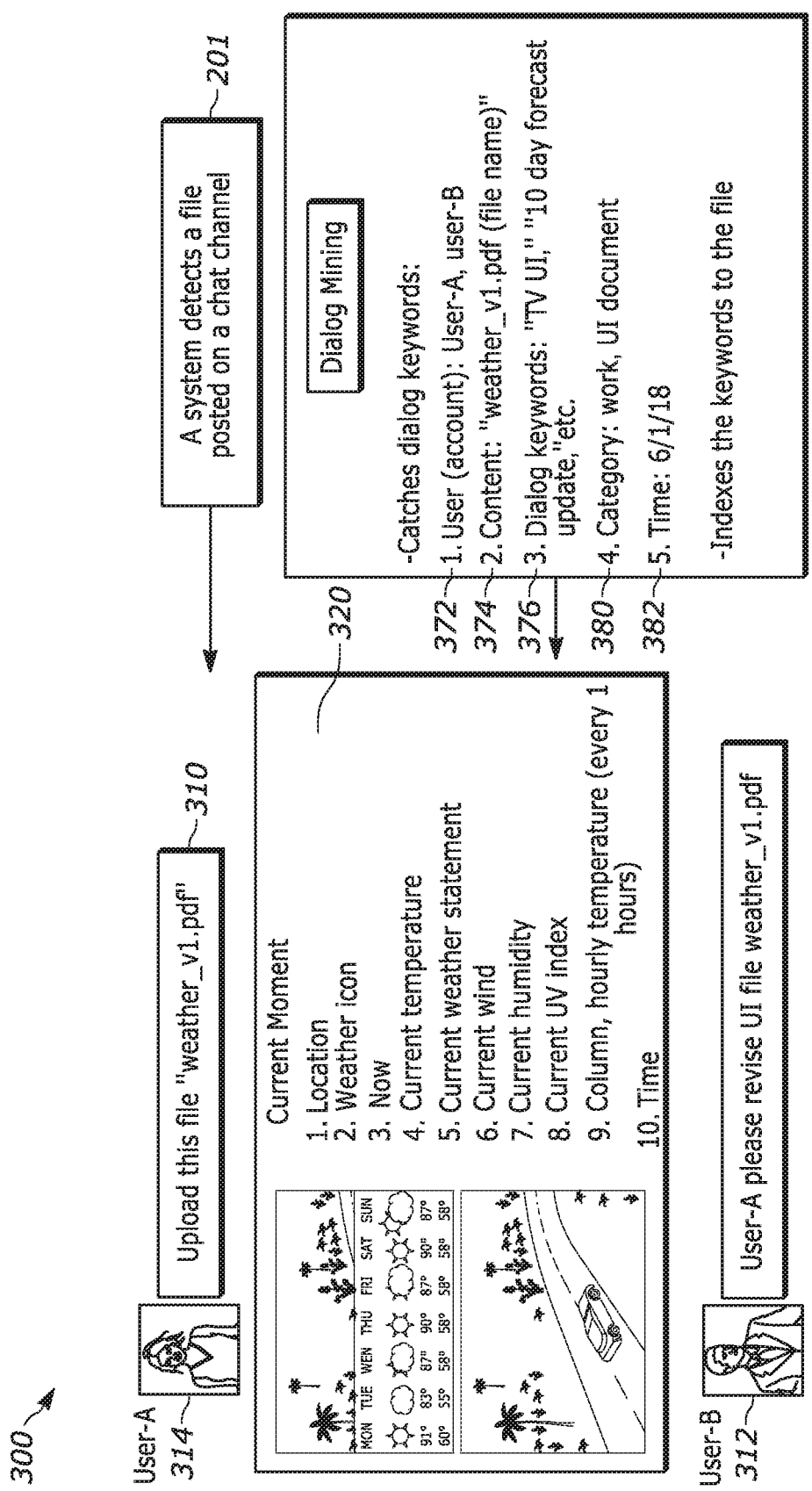
FIG. 3 illustrates an example of dialog-based mining and indexing in response to a file posting according to embodiments of the present disclosure.

FIG. 3 illustrates an example of conversation-based mining and indexing in response to a file posting according to embodiments of the present disclosure. The embodiment of a conversation-based mining and indexing in response to a file posting 300 shown in FIG. 3 is for illustration only. Other embodiments could be used without departing from the scope of the present disclosure.

In the example shown in FIG. 3, the intelligent assistant system 201 is able to detect a file 310 being posted or uploaded. In certain embodiments the Dialog Catch Manager 210 is able to detect a file 310 being posted in a 3$^{rd}$ party social media application (e.g., 3$^{rd}$ party application 320). For example, as illustrated in FIG. 3, the Dialog Catch Manager 210 of the intelligent assistant system 201 is able to detect a pdf file, called "weather_v1.pdf" 310, being posted on a chat or Social Networking Service (SNS) channel. As described herein, a file being posted or uploaded is referred to as a posting event.

In some embodiments, the Dialog Catch Manager 210, in response to detecting a posting event, is configured to begin collecting a user-A's 312 and a user-B's 314 conversation keywords for the posted file 310. That is, from the time the file 310 is posted, the intelligent assistant system 201 is configured to collect, and keep collecting, users' conversation keywords related to the uploaded file 310 using predefined keyword rules.

In some embodiments, the predefined keyword rules for the conversation keywords can include keywords related to a conversation about the posted file 310. In certain embodiments, the mined conversation keywords can be keywords associated with the user's account 372. For example, in the illustrative example of FIG. 3, the mined keywords for the user's account 372 are "user-A" and "user-B." In certain embodiments, the mined keywords can be content information 374. For example, in the illustrative example of FIG. 3, the mined conversation keywords for the content information 374 are "weather_v.1.pdf." In certain embodiments, the mined conversation keyword can be dialog keywords 376.

For example, in the illustrative example of FIG. 3, the mined dialog keywords 376 are "TV UI", "10 day forecast update," and the like. In certain embodiments, the mined keyword can be user preference information 378 (not shown). In certain embodiments, the mined keywords can be a category 380. For example, in the illustrative example of FIG. 3 the category 380 of the file 310 is "work, UI document." In certain embodiments, the mined keyword can be metadata 382 for the posted file 310. For example, in the illustrative example of FIG. 3 the metadata 382 is the date "6/1/18."

In certain embodiments, the Dialog Catch Manager 210 collects conversation keywords related to the posted file 310 by another user. For example, if another user makes comments about the posted file 310, the Dialog Catch Manager 210 keeps collecting the conversation keywords related to the posted file 310. In certain, embodiments the Account Manager 250 can identify the owner of the posted file 310 and the Dialog Catch Manager 210 is able to use the identity of the user-B 312 as a conversation keyword for the posted file. That is, the Dialog Catch Manager 210 is configured to continually mine conversation keywords from multiple users in response to detecting a file 310 posting.

In some embodiments, the mined conversation keywords are used by the File Index Manager 220 to index the posted file 310. In certain embodiments, the File Index Manager 220 indexes the mined conversational keywords to the Dialog Keyword Database 240. That is, File Index Manager 220 stores the collected keywords to Dialog Keyword Database 240. In certain embodiments, the File Index Manager 220 is able to index the metadata of the posted file 310 to the Dialog Keyword Database 240.

Figure 4:
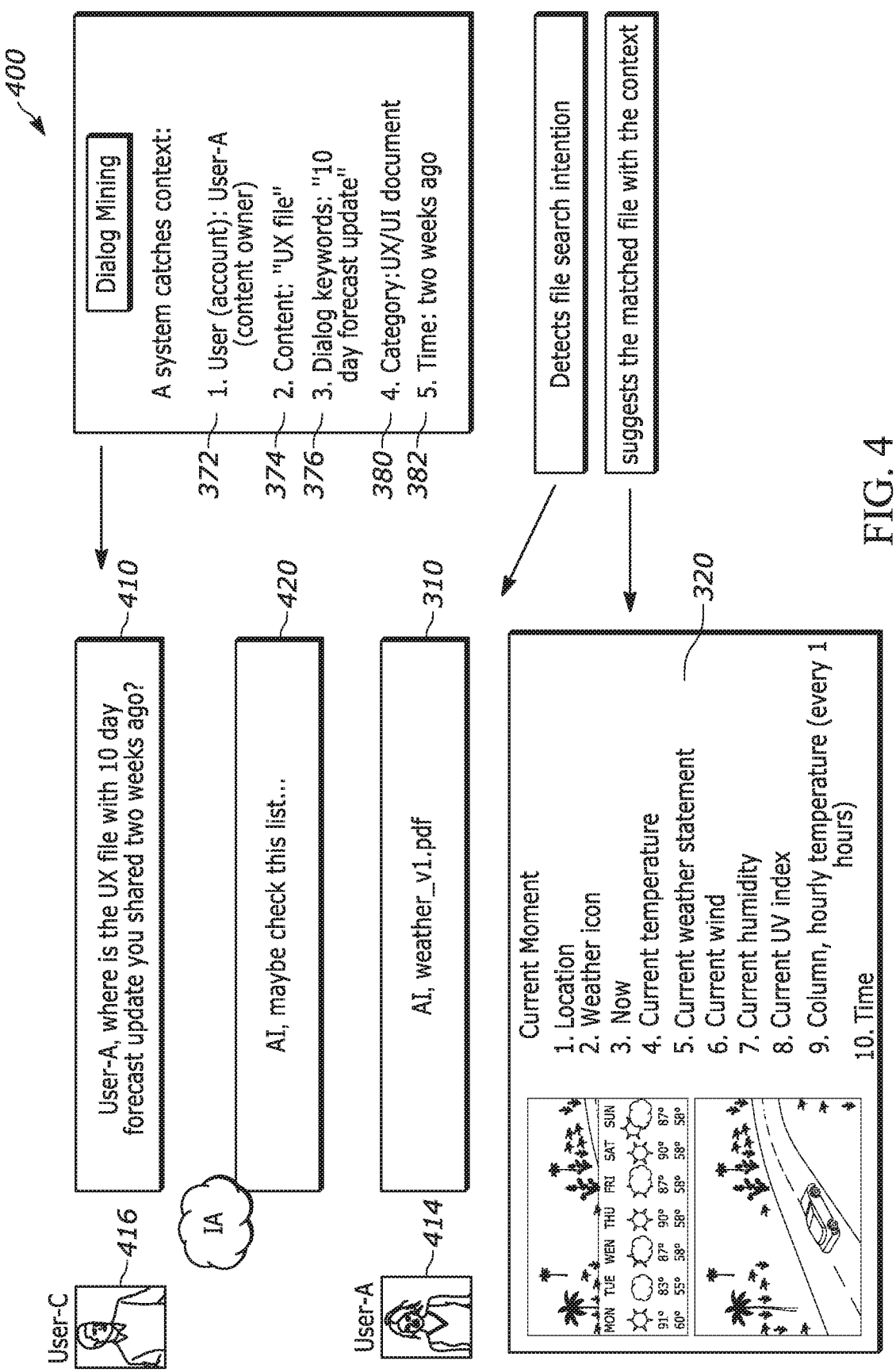
FIG. 4 illustrates an example of dialog-based file search and suggestion according to embodiments of the present disclosure.

FIG. 4 illustrates an example of conversation-based file search and suggestion in an intelligent assistant according to embodiments of the present disclosure. The embodiment of conversation-based file search and suggestion in an intelligent assistant 400 shown in FIG. 4 is for illustration only. Other embodiments could be used without departing from the present disclosure.

Subsequently, a user-C 412 can attempt to retrieve the file 310 that has been previously indexed by the File Index Manager 220 as described herein in FIG. 3. However, the user-C 412 attempting to retrieve the file 310 may not know or cannot recall where the file 310 is store and may not know or cannot recall the name of the file 310. For example, as illustrated in FIG. 4, the user-C 412 is attempting to retrieve the pdf file 310, called "weather_v1.pdf", that was indexed by the File Index Manager 220 as described herein in FIG. 3, "User-A, where is the UX file with 10 day forecast update you shared two weeks ago?" Under these circumstances, the intelligent assistant system 201 is able to help the user-C 412 retrieve the file 310 that they are attempting to find.

In certain embodiments, the Search and Suggestion Manager 260 is able to detect a query for the file 310 that has been previously indexed by the File Index Manager 220 by mining the conversation for keywords associated with a query. For example, the Search and Suggestion Manager 260 is able to detect that "User-A, where is the UX file with 10 day forecast update you shared two weeks ago" is a query 410 for the indexed file 310 by mining the query 410 for keywords associated with a query and/or keywords associated with the indexed file 310.

In some embodiments, the Search and Suggestion Manager 260 is able to detect a query for an indexed file 310 by mining conversation keywords related to the user-C's 412 query using predefined rules. In certain embodiments, the mined conversation keywords can be keywords associated with the user account 372. For example, in the illustrative example of FIG. 4, the mined keywords for the user's account 372 is "User-A". In certain embodiments, the mined keywords can be content information 374. For example, in the illustrative example of FIG. 4, the mined keywords for the content information 374 is "UX file." In certain embodiments, the mined keyword can be dialog keywords 376. For example, in the illustrative example of FIG. 4, the mined dialog keywords 376 are "10 day forecast update." In certain embodiments, the mined keyword can be user preference information 378 (not shown). In certain embodiments, the mined keyword can be a category 380. For example, in the illustrative example of FIG. 4 the category 380 of the file 310 is "UX/UI document." In certain embodiments, the mined keyword can be index metadata 382 for the file 310. For example, in the illustrative example of FIG. 4 the mined metadata 382 is the date "two weeks ago."

In some instances, the user-C 412 can attempt to retrieve the pdf file 310 by contacting the owner, user-A 414, of the posted file 310 through the same 3$^{rd}$ party application 320 that the owner, user-A 414, used to post the pdf 310. For example, as illustrated in FIG. 4, the user-C 412 is able to initiate a search for the weather_v1.pdf file 310 by asking the owner, user-A 414, of the pdf file through the same chat or SNS channel that the owner, user-A 414, used to post the pdf file 310 for the file's 310 location. In certain embodiments, the intelligent assistant system 201 is able to detect a query for an indexed file 310 by monitoring 3$^{rd}$ party applications (e.g., 3$^{rd}$ party application 320) for query keywords associated with an indexed file 310. That is, the Dialog Catch Manager 210 can detect an event associated with a file 310 request based on the query keywords used by the user-C 412 attempting to retrieve the file 310.

In response to identifying a query for a file 310, the Search and Suggestion Manager 260 is able perform a keyword search of the dialog Keyword Database 240 for a file index matching the query keywords. If a file exists matching the query keyword(s), then the Search and Suggestion Manager 260 makes a suggestion for the searched file by showing the found file. In certain embodiments, the found file is shown in the same chat or SNS channel that the user-C 412 initiated the query through. In certain embodiments, the found file is downloaded into a local device 282. In certain embodiments, the keyword index of the downloaded file can be the same as the found file. That is, download file can have the same keyword index for future searches on the local device 282.

If multiple files exist matching the query keyword(s), then the Search and Suggestion Manager 260 makes a suggestion for the searched file 310 by showing multiple candidate files for consideration by the user-C 412 making the file query. In certain embodiments, the candidate files are shown a same chat or SNS channel that the user-C 412 initiated the query through. In certain embodiments a file 310 selected by the user 416 from the candidate files can be downloaded into a local device 282. In certain embodiments, the keyword index of the downloaded file can be the same as the candidate file selected by the user-C 412. That is, a file from the suggested list of the chat service can be downloaded into a local device 282 and even have the same index data for a future search on the local device 282.

Figure 5:
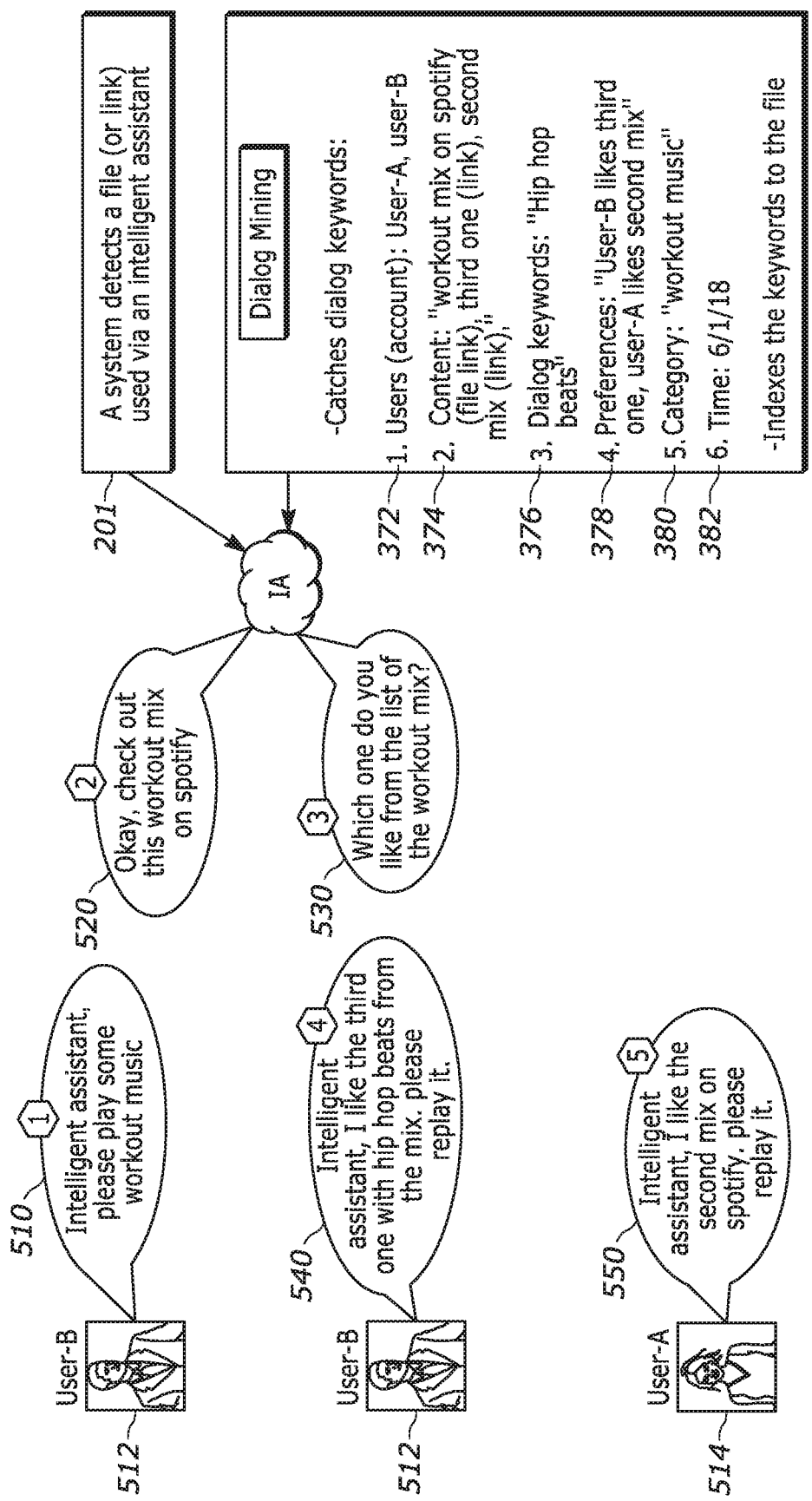
FIG. 5 illustrates an example of an intelligent assistant determining a user's preference for a file on a $3^{rd}$ party application according to embodiments of the present disclosure.

FIG. 5 illustrates an example of an intelligent assistant system 201 determining a user-B's 512 preference for a file 310 on a 3$^{rd}$ party application 320 according to embodiments of the present disclosure. The embodiment of an intelligent assistant system 201 determining a user-B's 512 preference for a file 310 in a 3$^{rd}$ party application 320 of FIG. 5 is for illustration only. Other embodiments could be used without departing from the scope of this disclosure.

As illustrated in FIG. 5, the system includes a user-B 512, a user-A 514, and an intelligent assistant system 201. The user-B 512 is able to request 510 that the intelligent assistant system 201 play some music from a music genre. For example, 510, "Intelligent Assistant please play some workout music." In response, the intelligent assistant system 201 is able to suggest 520 music matching the requested genre from a media service. For example, 520, "Okay check out this workout mix on Spotify."

In some embodiments, the Dialog Catch Manager 210 is able to directly determine 530 a user-B's 512 preference for a music file or genre by asking for feedback. For example, 530, "which one do you like from the list of workout music." If the user-B's 512 responses, the intelligent assistant system 201 is able to directly determine the user-B's 512 preference 540 based on the user-B's 512 response. For example, 540, "Intelligent Assistant, I like the third one with the hip hop beats from the mix. Please replay it."

In some embodiments, the Dialog Catch Manager 210 is able to indirectly determine a user-B's 512 preference for the music file or genre. For example, the Dialog Catch Manager 210 is able to indirectly determine the user-B's 512 preference for the music file based on the number of times that the user-B's 512 requests that the music file be played.

In some embodiments, the File Index Manager 220 is able to update the dialog Keyword Database 240 for the file 310 by mining conversation keywords related to the users', 512 and 514, preferences. In certain embodiments, the mined conversation can be keywords associated with the user's account 372. For example, in the illustrative example of FIG. 5, the mined keywords for the users' account 372 are "user-A" and "user-B". In certain embodiments, the mined keywords can be content information 374, and the content information 374 can include a link for the content. For example, in the illustrative example of FIG. 5, the mined keywords for the content information 374 are "workout mix on Spotify (file link), third one (link), second one (link)." In certain embodiments, the mined keyword can be dialog keywords 376. For example, in the illustrative example of FIG. 5, the mined dialog keywords 376 are "Hip hop beats." In certain embodiments, the mined keyword can be user preference information 378. For example, in the illustrative example of FIG. 5, the mined user preference information 378 is that "user-B likes the third one and user-A likes the second mix." In certain embodiments, the mined keyword can be a category 380. For example, in the illustrative example of FIG. 5 the category 380 of the music or the music genre is "workout music." In certain embodiments, the mined keyword can be metadata 382. For example, in the illustrative example of FIG. 5 the metadata 382 is the date "6/1/18." In certain embodiments, the File Index Manager 220 indexes the keywords to the content link of the workout file 310.

In some embodiments, the Dialog Catch Manager 210 is able to further index additional feedback from a user-A 514 on the music file 310 or genre. For example, if a user-A 514 responses, 550, "Intelligent Assistant, I like the second mix on Spotify, Please replay it," then the Dialog Catch Manager 210 is able to directly determine the user-A's 514 preference for the second mix.

Figure 6:
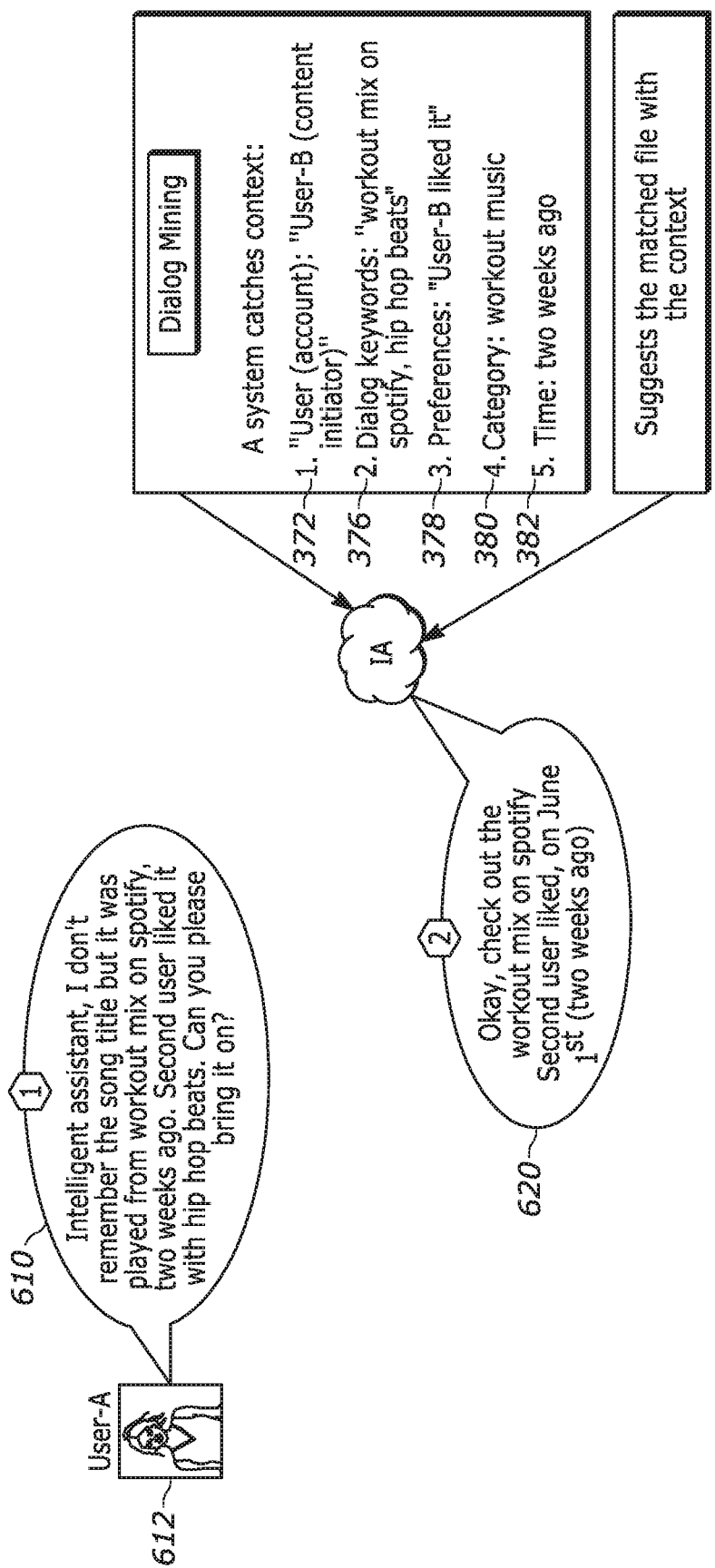
FIG. 6 illustrates an example of a dialog-based file search and suggestion of content on a $3^{rd}$ party application according to embodiments of the present disclosure.

FIG. 6 illustrates an example of conversation-based file search and suggestion of content on a 3$^{rd}$ party application according to embodiments of the present disclosure. The embodiment of conversation-based file search and suggestion of content on a 3$^{rd}$ party application in FIG. 6 is for illustration only and other embodiments could be used without departing from the scope of this disclosure.

As illustrated in FIG. 6, the system includes a user-A 612 and an intelligent assistant system 201. In some embodiments, the user-A 612 is able to request that the intelligent assistant system 201 locate a file 310 previously indexed with a user-A's 612 conversation keyword(s), as described herein in FIG. 5. In certain embodiments, the user-A 612 is able to query the intelligent assistant system 201 to search for a file 310 stored on a $3^{rd}$ party application 320. In certain embodiments, the user-A 612 is able to ask the intelligent assistant system 201 to search for a file 310 using conversation keywords that the user-A 612 has memorized from a previous conversation. For example, in the illustrative example of FIG. 6, 610, "Intelligent Assistant, I don't remember the song title, but it was played from workout mix on Spotify, two weeks ago, User-B liked it with Hip Hop beats. Can you please bring it on?"

In some embodiments, the Dialog Catch Manager 210 of the intelligent assistant system 201 mines the user-A's 612 requests to search for a file 310 for query keywords related to the file search. For example, in the illustrative example of FIG. 6, the mined query keywords for the user's account 372 is "User-B" who was the content initiator. In certain embodiments, the mined query keywords can be content information 374, and the content information can include a link for the content (not shown). In certain embodiments, the mined query keyword can be dialog keywords 376. For example, in the illustrative example of FIG. 6 the mined query dialog keywords 376 are "workout mix on Spotify, hip hop beats" In certain embodiments, the mined query keywords can be user preference information 378. For example, in the illustrative example of FIG. 6, the mined query preference information 378 keywords are "User-B liked it." In certain embodiments, the mined keyword can be a category 380 or file genre. For example, in the illustrative example of FIG. 6 the category 380 of the file or the file genre is "workout music." In certain embodiments, the mined query keyword can be metadata 382. For example, in the illustrative example of FIG. 6 the metadata 382 is the date "two weeks ago."

In some embodiments, the Search and Suggestion Manager 260 is able to locate an index of a file matching the query keywords. In certain embodiments, the index of the file is located is on a different database from the content of the file. For example, the index of the file can be located on a cloud database 280 and the contents of the file 310 can be on the database of a $3^{rd}$ party application 320. In certain embodiments, the Search and Suggestion Manager 260 is able to retrieve the contents of a file 310 stored on a $3^{rd}$ party application 320. For example, in the illustrative embodiment of FIG. 6, the intelligent assistant system 201 responses, 620, "Okay check out the workout mix on Spotify User-B liked on June $1^{st}$ (two weeks ago)." That is, the Search and Suggestion Manager 260 responds to the file search query by suggesting a file that is stored on a $3^{rd}$ party application 320 to query made from a local device 282. Therefore, even though the user-A 612 made the search query through the intelligent assistant system 201 of the local device 282, the intelligent assistant system 201 was able to search files stored on a $3^{rd}$ party application 320, because the indexes for these files are maintained in the Dialog Keyword Database 240 of a cloud database 280.

Figure 7:
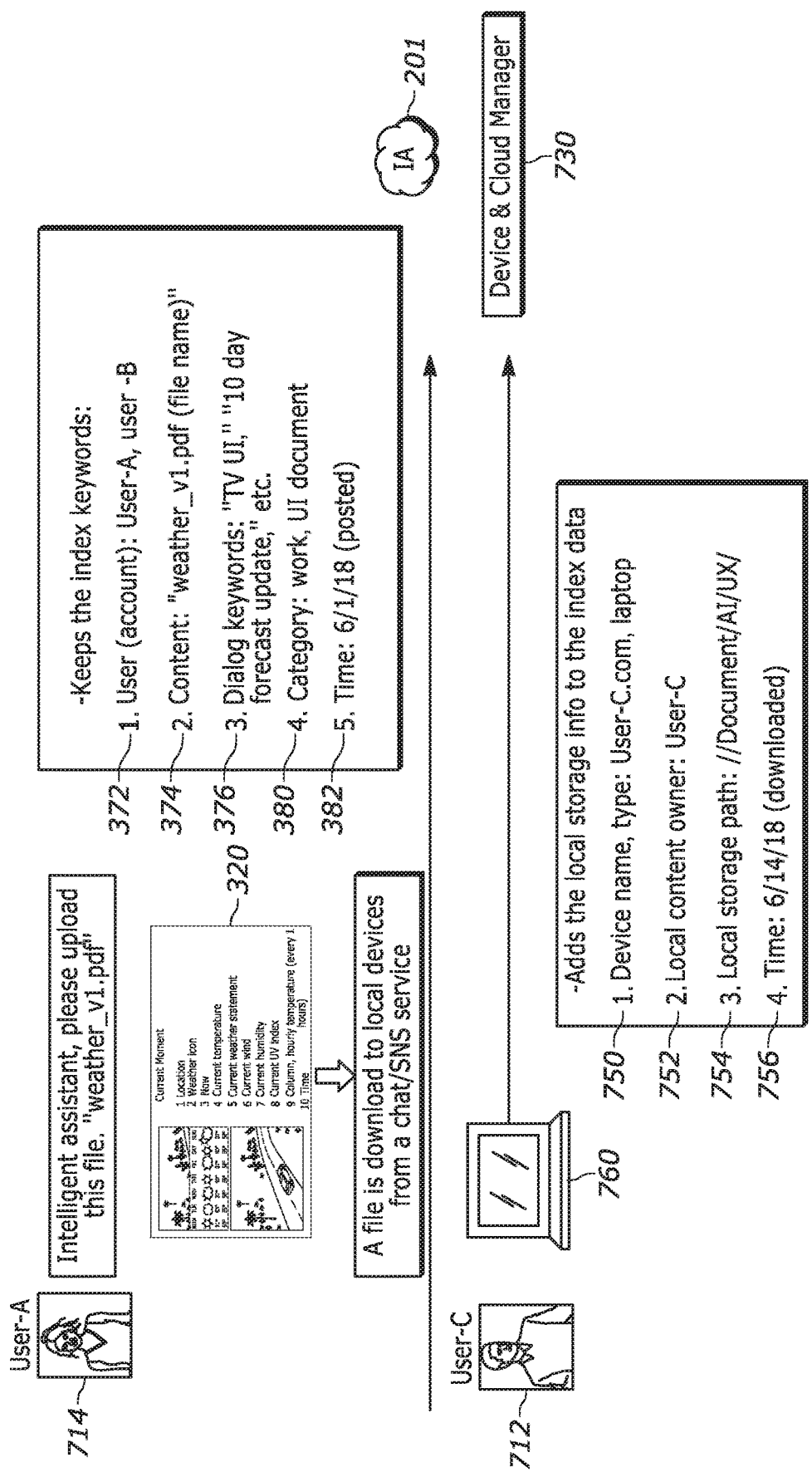
FIG. 7 illustrates an example of dialog-based file download and indexing of content from a $3^{rd}$ party application to a local device according to embodiments of the present disclosure.

FIG. 7 illustrates an example of conversation-based file download and indexing of content from a $3^{rd}$ party application to a local device according to embodiments of the present disclosure. The embodiment of conversation-based file download and indexing of content from a $3^{rd}$ party application 320 to a local device 282 illustrated in FIG. 7 is for illustration only. Other embodiments could be used without departing from the scope of this disclosure.

As illustrated in FIG. 7, the system includes a user-A 712, a user-C 714, and an intelligent assistant system 201. In some embodiments, the user-A 712 is able to request that the intelligent assistant system 201 download an indexed file from a $3^{rd}$ party application 320 to a local device 282 through the Device and Cloud Manager 270 of the intelligent assistant system 201. For example, in the illustrative Example of FIG. 7, the indexed file 310 "weather_v1.pdf" has been download from a $3^{rd}$ party application 320 by the intelligent assistant system 201 to the user-C's laptop 760.

In some embodiments, the intelligent assistant system 201 keeps the existing index to the download file in the Dialog Keyword Database 240, so that the downloaded file 310 can be located through the Device and Cloud Manager 270 in a future search. That is the intelligent assistant system 201 keeps the existing index having keywords mined by the Dialog Catch Manager 210. For example, in the illustrative Example of FIG. 7, the mined and indexed keywords for the users' accounts, 372, are "user-A" and "user-B" who was the content initiator. In certain embodiments, the mined and indexed keywords can be content information 374, and the content information 374 can include a link for the content. For example, in the illustrative example, of FIG. 7, the mined and indexed content keywords are the filename "weather_v1.pdf." In certain embodiments, the mined and indexed keyword can be dialog keywords 376. For example, in the illustrative example of FIG. 7, the mined and indexed dialog keywords 376 are "TV UI, 10-day forecast, update, and the like." In certain embodiments, the mined and indexed keywords can be user preference information 378 (not shown). In certain embodiments, the mined and indexed keywords can be a category 380 or file genre. For example, in the illustrative example of FIG. 7 the category 380 of the file or the file genre is "work and UI document." In certain embodiments, the mined and indexed keyword can be metadata 382. For example, in the illustrative example of FIG. 7 the metadata 382 is the date "6/1/18" that the file 320 was posted.

In certain embodiments, the system updates the existing index of the downloaded file 310 in the Dialog Keyword Database 240 of the cloud database 280 with the metadata of the local device 282 so that the download file 310 can be located in a future search. For example, in the illustrative Example of FIG. 7, the updated index keywords include "user-A," 712, who is the local content owner 752. In certain embodiments, the updated index keywords can be content information, and the content information can include a link for the download content. For example, in the illustrative example, of FIG. 7, the content information keywords are the filename 374 "weather_v1.pdf," the local device name 750 "user-C.com laptop," 760, and the local storage path 754 "//Document/AI/UX/" for the download content. In certain embodiments, the mined and indexed keyword can be updated metadata 756. For example, in the illustrative example of FIG. 7 the updated metadata 756 is the date "6/14/18" that the file was download to the local device 282, which is the user-C's laptop 760. That is the system updates the existing index with the local storage information keywords mined by the Dialog Catch Manager 210, such as, "device name," "device type," "local content owner," "local storage path," "downloaded time," and the like. This process allows for conversation-based file downloading and indexing of content from a $3^{rd}$ party application to a local device 282, which can be located by a future search.

Figure 8:
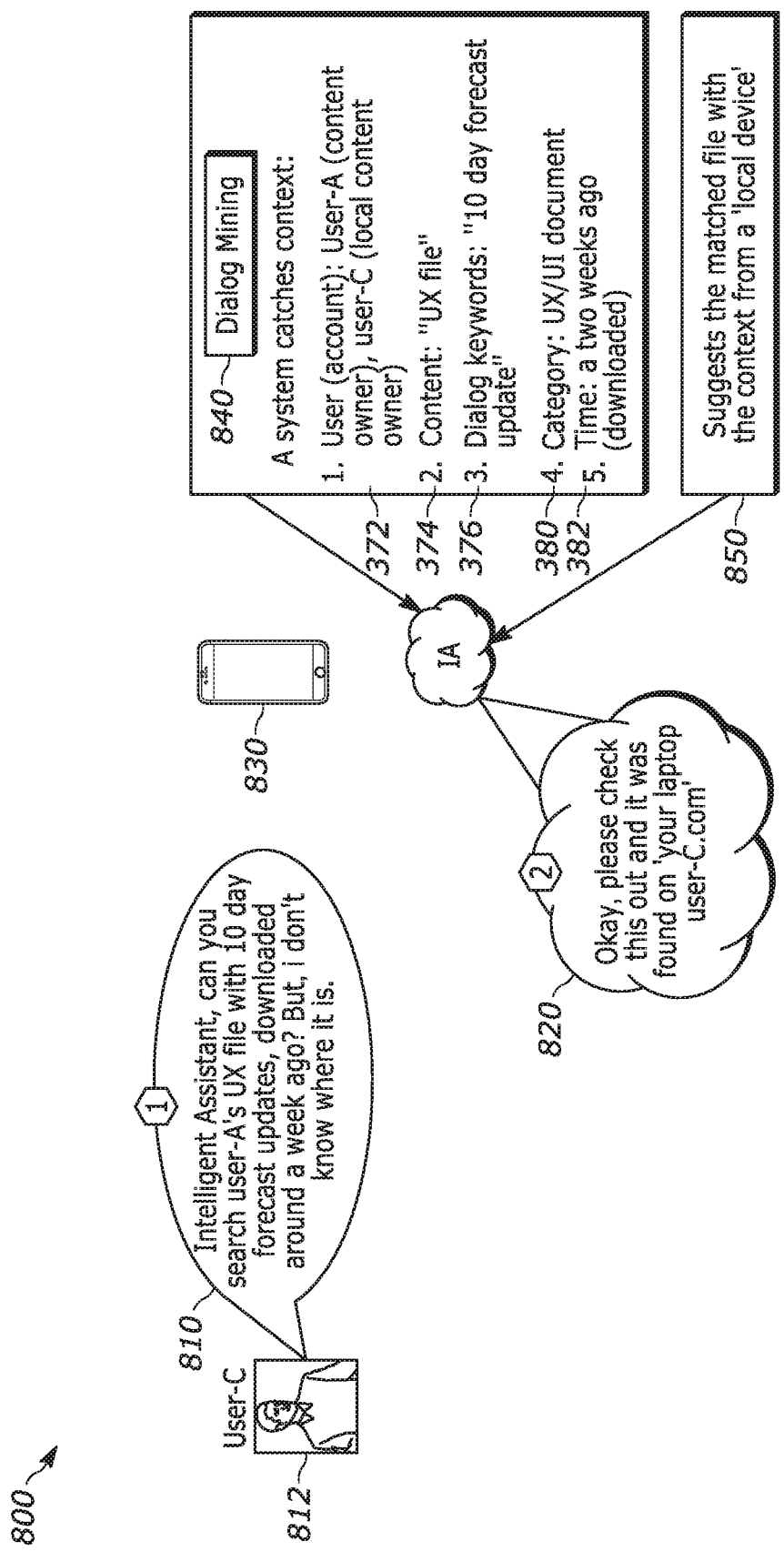
FIG. 8 illustrates example of dialog-based cross-device file search and suggestion of content on a local device according to embodiments of the present disclosure.

FIG. 8 illustrates an example of conversation-based cross-device file search and suggestion of content on a local device according to embodiments of the present disclosure. The embodiment of conversation-based cross device file search and suggestion of content on a local device in FIG. 8 is for illustration only. Other embodiments could be used without departing from the scope of this disclosure.

As illustrated in FIG. 8, the system includes a content owner (e.g., user-A), a local content owner (e.g., a user-C 812), and an intelligent assistant system 201. In some embodiments, the user-C 812 is able to request that the intelligent assistant system 201 locate a file 310 stored on a local device 282. In certain embodiments, the user-C 812 is able to ask the intelligent assistant system 201 to search for a file 310 using conversation keywords that the user-C 812 has memorized. For example, in the illustrative example of FIG. 8, 810, "Intelligent Assistant, can you search user-A's UX file with 10 day forecast updates, downloaded around a week ago? But I don't know where it is."

In some embodiments, the Dialog Catch Manager 210 of the intelligent assistant device 201, mines the user-C's 812 request to search for query keywords related to the file search. For example, in the illustrative example of FIG. 8, the mined query conversation keywords for the user's account 372 is "user-A" who is the content owner. In certain embodiments, the mined query keywords can be content information 374, and the content information 374 can include a link for the content. For example, in the illustrative example of FIG. 8, the mined query keywords for the content information 374 are "UX file". In certain embodiments, the mined query keyword can be dialog keywords 376. For example, in the illustrative example of FIG. 8, the mined query dialog keywords 376 are "10 day forecast update." In certain embodiments, the mined query keyword can be user preference information 378 (not shown). In certain embodiments, the mined keyword can be a category 380. For example, in the illustrative example of FIG. 8 the category 380 of the file or the file genre is "UX/UI document." In certain embodiments, the mined query keyword can be metadata 382. For example, in the illustrative example of FIG. 8 the metadata 382 is the date "a week ago" and the location "downloaded."

In some embodiments, the Search and Suggestion Manager 260 is able to locate an index of a file matching the query keywords. In certain embodiments, the index of the file is located on a different database from the content of the file. For example, the index of the file 310 can be located on a cloud database 280 and the contents of the file is located on the database of a local device 282. In certain embodiments, the Search and Suggestion Manager 260 is able to retrieve the contents of a file stored on a local device 282. For example, in the illustrative example of FIG. 8, the intelligent assistant system 201 responses, 820, "Okay, please check this out and it was found on 'your laptop, user-C.com'." That is, the Search and Suggestion Manager 260 responds to the file search query by suggesting a file that is stored on a local device 282 or laptop 760. In certain embodiments, the Search and Suggestion Manager 260 is able to support cross-device searches. For example, in the illustrative example of FIG. 8 the user-C 812 initiated the file search through the intelligent assistant system 201 of a mobile device 830 and the contents of the file were stored on another local device 282 or laptop 760. That is, even though the local content owner 812 made the search query through the intelligent assistant system 201 of a mobile device 830 that was different from another local device 282, or laptop 760, storing the file 310, the intelligent assistant system 201 of the mobile device 830 was able to search files stored in different local device 282, or laptop 760, because the indexes for the file 310 is maintained in the Dialog Search and dialog Keyword Database 240 of a cloud database 280.

Figure 9:
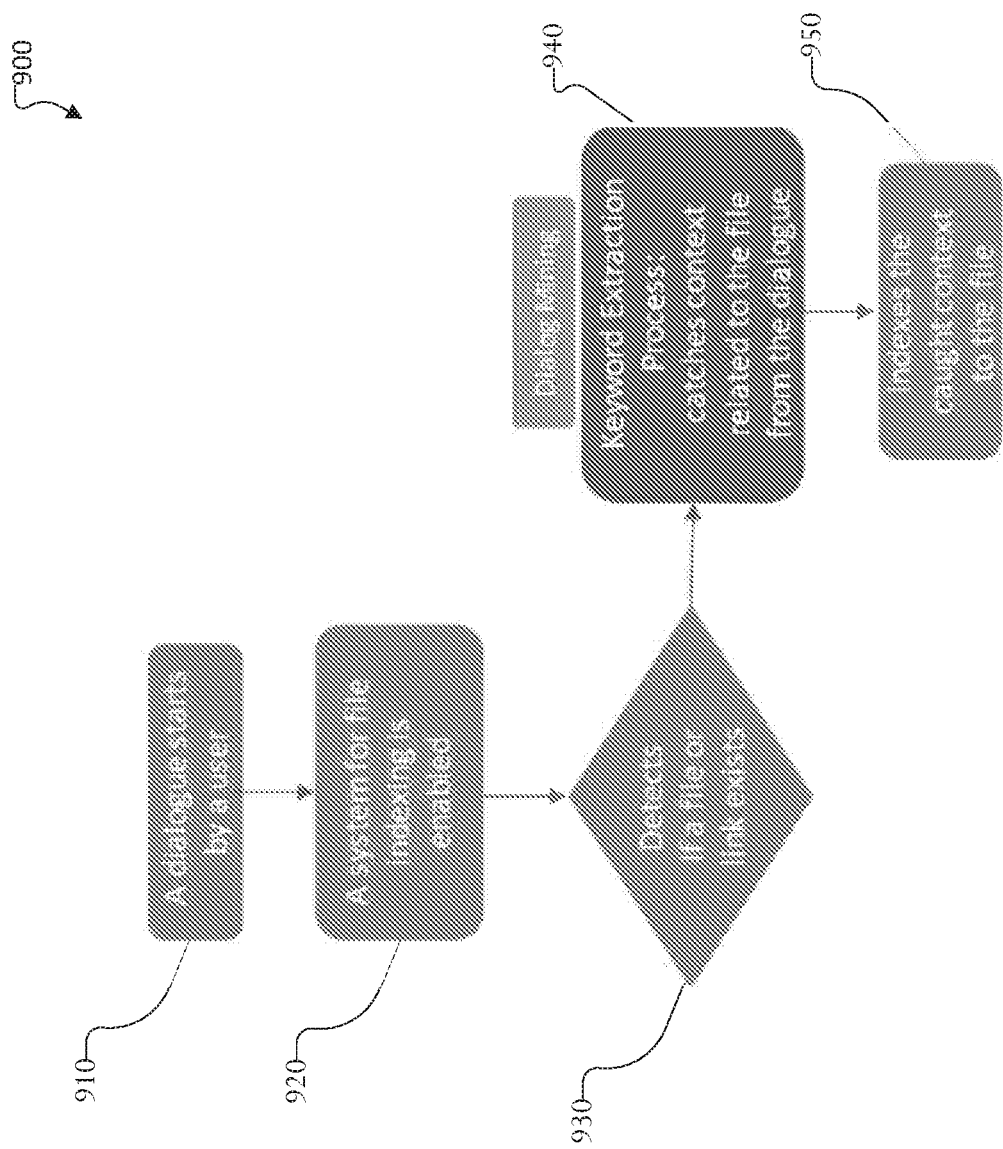
FIG. 9 illustrates operations of a process for dialog-based file indexing according to embodiments of the present disclosure.

FIG. 9 illustrates operations of a process 900 for conversation-based file indexing according to embodiments of the present disclosure as can be performed by a processor 120. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the concurrence of intervening or intermediate steps. The process 900 depicted in the example depicted is implemented by a processor 120 in, for example, an intelligent assistant system 201.

In block 910, the processor 120 detects the start of a conversation between one or more users. In some embodiments, the processor 120 detects the start of a conversation between a single user and the intelligent assistant system 201. In certain embodiments, the processor 120 detects the start of a conversation between a user-A and a user-B or a plurality of users. The Dialog Catch Manager 210 is defined as the functional module of this feature in this Application. Subsequently, the processor 120 in block 920, enables a process, the conversation-based file indexing process. The File Index Manager 220 is defined as the functional module of this feature in this Application.

In block 930, the processor 120, monitors the conversation between the one or more users. The Dialog Catch Manager 210 is defined as the functional module of this feature in this Application. Subsequently, the processor 120 in block 930, determines from monitoring the conversation between the one or more users whether a file 310 has been newly posted or re-upload. In some embodiments, the processor 120 identifies the type of file and detects whether the file 310 has been posted in a $3^{rd}$ party social media application (e.g., $3^{rd}$ party application 320). For example, the processor 120 is able to detect a pdf file being posted on a chat or Social Networking Service. In certain embodiments, the processor 120 detects whether a link for the file 310 exists.

In block 940, the processor 120, responsive to identifying that a file 310 has been posted, or upload, enables a process, the Keyword Extraction Process, to mine at least one conversation keyword associated with the posted file 310 from the conversation between the one or more users. The Dialog Catch Manager 210 is defined as the functional module of this feature in this Application.

Subsequently, the processor 120, in block 950, responsive to the Keyword Extraction Process in block 940 mining at least one conversation keyword from the conversation associated with the posted file, indexes the mined conversation keyword to a database. In some embodiments, the File Index Manager 220 indexes the mined conversation keywords to the Dialog Keyword Database 240. In certain embodiments, the index of the file 310 is maintained in the Dialog Keyword Database 240 of a cloud database 280 (such as on a cloud server). That is, the system indexes the collected conversation keywords to the file 310 and stores the index data to the Dialog Keyword Database 240 for future retrieving events. The File Index Manager 220 is defined as the functional module of this feature in this Application.

Figure 10:
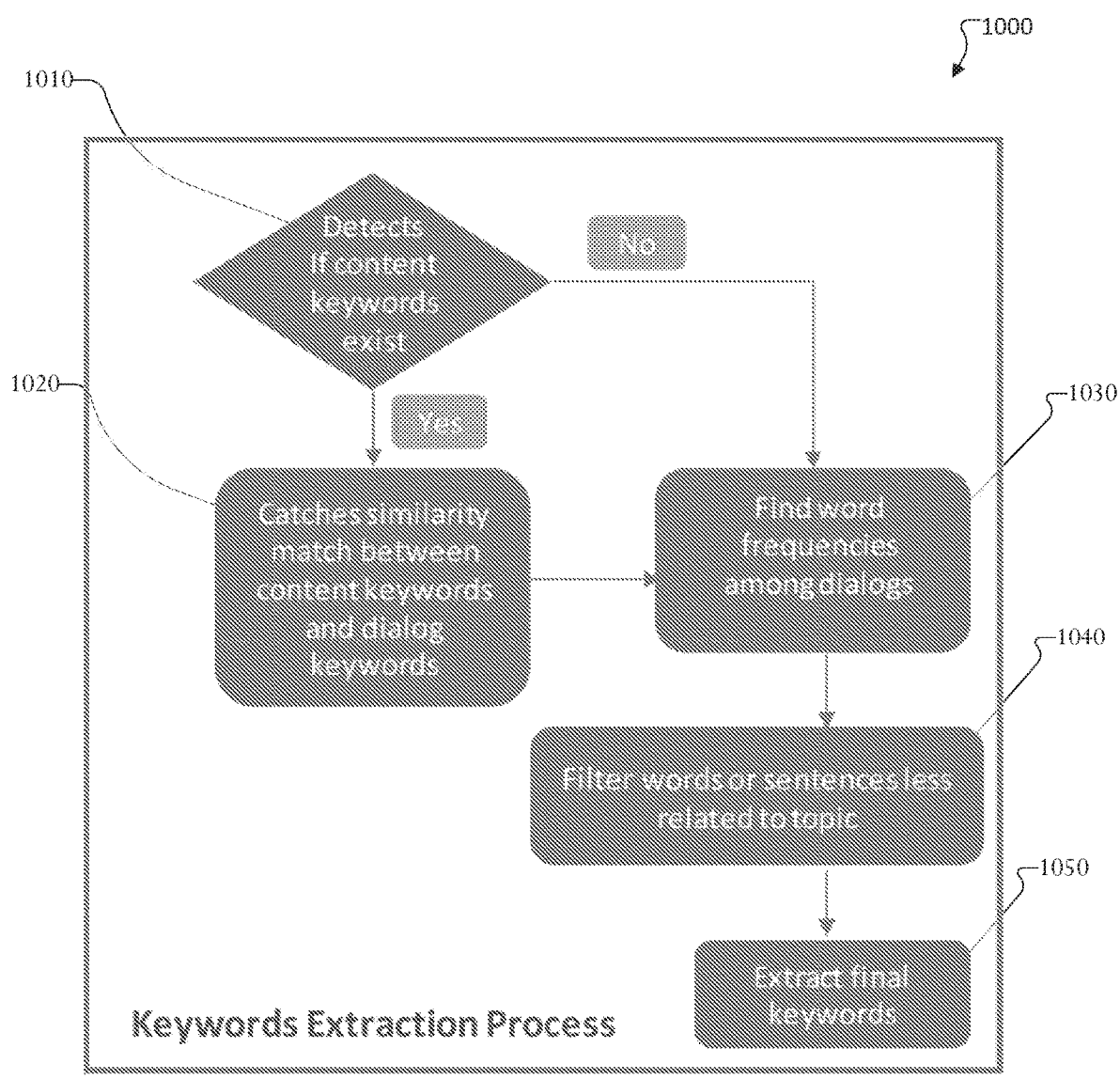
FIG. 10 illustrates operations of a process for keyword extraction according to embodiments of the present disclosure.

FIG. 10 illustrates operations of a process 1000 for keyword extraction according to embodiments of the present disclosure as can be performed by a processor 120. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the concurrence of intervening or intermediate steps. The process 1000 depicted in the example depicted is implemented by a processor 120 in, for example, an intelligent assistant system 201.

In block 1010, the processor 120, determines whether there are content keywords in a file 310 that has been newly posted or uploaded. In some embodiments the processor 120 is able to identify content keywords that exists in text documents, audio files, video files with voice-over, and the like. In certain embodiments, the processor 120 detects whether there are content keywords in a link for a file.

In block 1020, the processor 120, responsive to determining that at least one content keyword exists in the file, enables a process, the Similarity Process, to identify words in the conversation, between the one or more users, matching the existing content keyword in the file 310. That is, the processor 120 detects the similarity between existing keywords and the conversation sentences and extracts possible keywords from the conversation sentences. The Dialog Catch Manager 210 is defined as the functional module of this feature in this invention.

In block 1030, the processor 120 enables a process, the Word Frequency and Filter Process, to determine the frequency with which words appear in the sentences of the conversation. In some embodiments, the Word Frequency and Filter Process is able to determine the frequency with which possible keywords from the conversation appear. That is, the frequency of words in the conversation that have been determined to be similar to content keywords of the file by the Similarity Process. In some embodiments, the Word Frequency and Filter Process is able to determine the frequency of only words appearing in the conversation when there are no possible keywords or a lack of possible keywords. That is, when the file has no content keywords or a lack of content keywords.

Subsequently, in block 1040, the Word Frequency and Filter Process filters non-keywords and sentences based on their determined word frequency. That is, the Word Frequency and Filter Process detects word frequencies among conversation sentences and then filters non-keyword related words and sentences. The Dialog Catch Manager 210 is defined as the functional module of this feature in this Application.

In block 1050, the processor 120, indexes the extracted final keywords words. The final keywords are content keywords mined from the file that are similar to conversation keywords mined from the conversation or only conversation keywords mined from conversation when there are no content keywords that have been filtered based on frequency. As describe, the Similarity Process and the Word Frequency and Filter Process extracts keywords from the conversation that are the most likely to be related to the user's interactions to the file.

Figure 11:
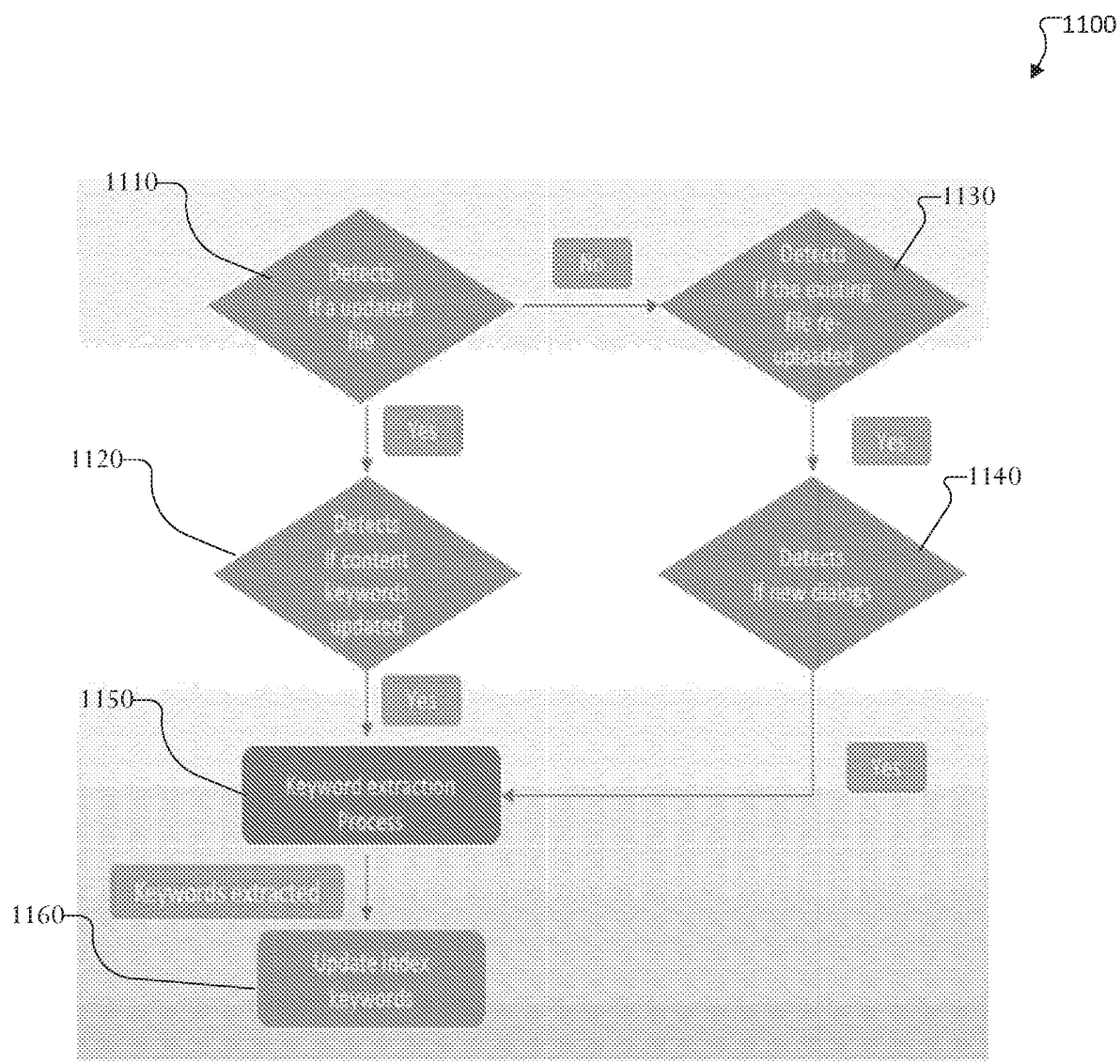
FIG. 11 illustrates operations of a process for updating keyword metadata according to embodiments of the present.

FIG. 11 illustrates operations of a process 1100 for updating keyword metadata according to embodiments of the present disclosure as can be performed by a processor 120. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the concurrence of intervening or intermediate steps. The process depicted in the example depicted is implemented by a processor 120 in, for example, an intelligent assistant system 201.

In block 1110, the processor 120, determines whether an update to a file 310 exists. In block 1120, the processor 120, determines, responsive to the file 310 being updated, whether the content keywords for the file 310 have been updated. In some embodiments, the processor 120 is able to determine whether the content keywords of text documents, audio files, video files with voice over, and the like have been updated. In certain embodiments, the processor 120 is able to determine whether the metadata of the file 320 has been updated.

In block 1130, the processor 120, determines, response to there being no update of the file 310, whether the file 310 has been re-upload. In block 1040, the processor 120, determines whether there is a new conversation between one or more users about the re-upload file 310.

In block 1150, the processor 120, responsive to either the content keywords for the updated file 310 being updated or a new conversation about the re-uploaded file 310, enables the Keyword Extraction Process. The Keywords Extraction Process mines content keywords from the updated file 310 or conversation keywords from the new conversation about the re-uploaded file 310.

Subsequently, the processor 120 in block 1150, enables a File Index Process, which updates the index for the updated or re-uploaded file 310 with the mined keywords. In some embodiments, the File Index Process is able to filter at least some of the existing index keywords. For example, the File Index Process filters out content keywords from the file index that are no longer content keywords for the updated file 310. In another example, the File Index Process filters out conversation keywords from the file index that are not part of the new conversation. In yet another example, the File Index Process filters out metadata from the file index that is not relevant to the updated or re-upload file. That is, a Keyword Metadata Update Process updates the file index with the content keywords or conversation keywords that are most likely to be most relevant to the user's further searches for the file 320.

Figure 12:
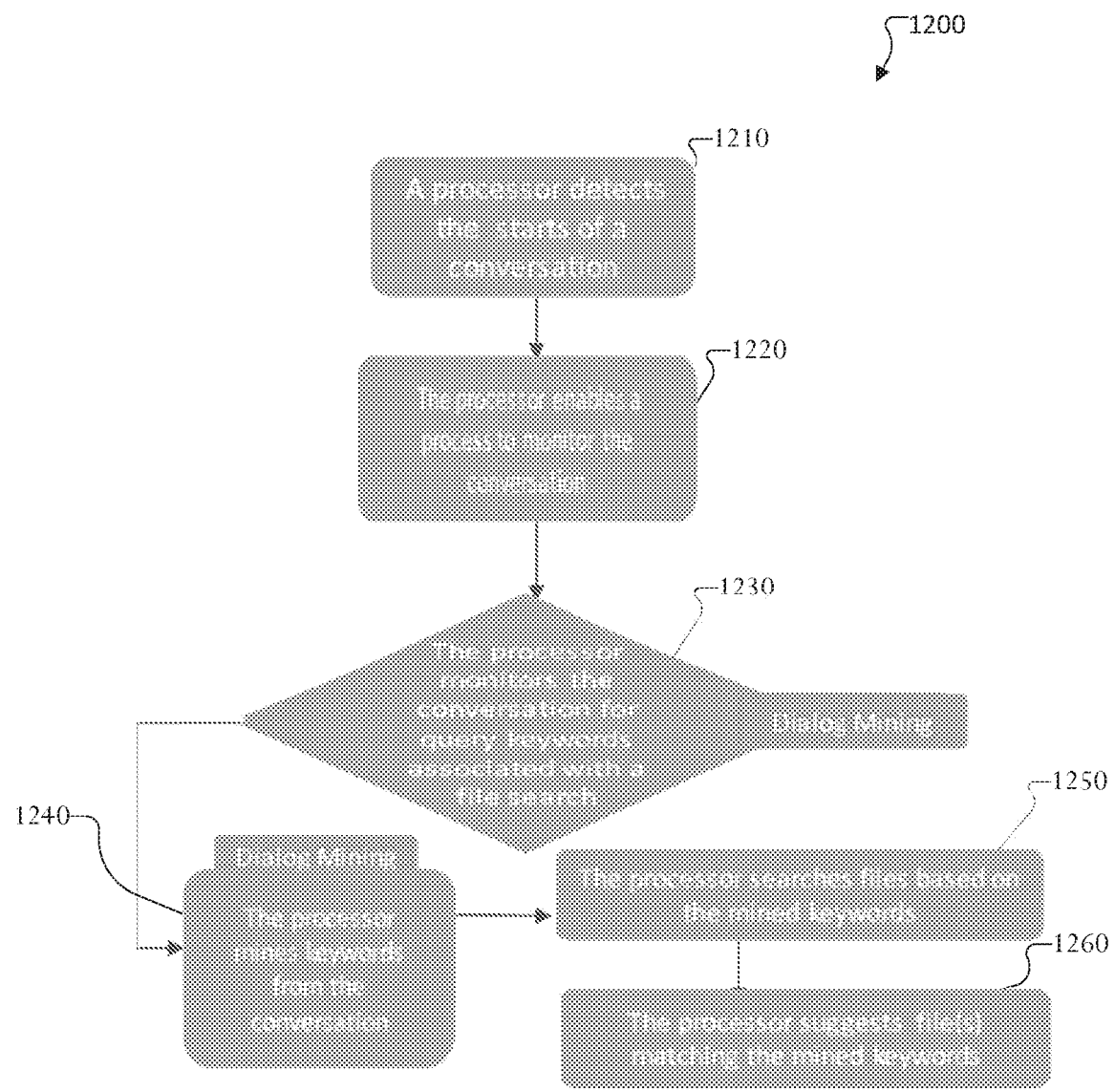
FIG. 12 illustrates operations of a process for dialog-based file search and suggestion according to embodiments of the present disclosure.

FIG. 12 illustrates operations of a process 1200 for conversation-based file search and suggestion according to embodiments of the present disclosure as can be performed by a processor 120. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the concurrence of intervening or intermediate steps. The process depicted in the example depicted is implemented by a processor 120 in, for example, an intelligent assistant system 201.

In block 1210, the processor 120 detected the start of a conversation between one or more users. In certain embodiments, the processor 120 detects the start of a conversation between a single user and an intelligent assistant system 201. In certain embodiments, the processor 120 detects the start of a conversation between a user-A and a user-B or a plurality of users. Subsequently, the processor 120 in block 1220, enables a process, the Dialog Catch Manager 210 to monitor the conversation.

In block 1230 the processor 120 monitors the conversation between one or more users for one or more query keywords related to a search query for a file. The Search Intention Detection process is defined as the functional module of this feature in this Application.

In block 1240, the Dialog Catch Manager, collects query keywords mined from the conversation related to the file search.

In block 1250, the processor 120, responsive to the Dialog Catch Manager 210 identifying one or one more query keywords related to the file search enables a process, the Search and Suggestion Manager 260. The Search and Suggestion Manager 260 searches the Dialog Keyword Database 240 to determine whether there is a file index matching the one or more query keywords mined by the Dialog Catch Manager 210.

Subsequently, the processor 120, in block 1260, responsive to the Search and Suggestion Manager 260 locating a file having the file index matching the one or more query keywords mined by the Dialog Catch Manager 210 suggests to the one or more users the located file. The Search and Suggestion Manager 260 is defined as the functional module of this feature in this Application.

Figure 13:
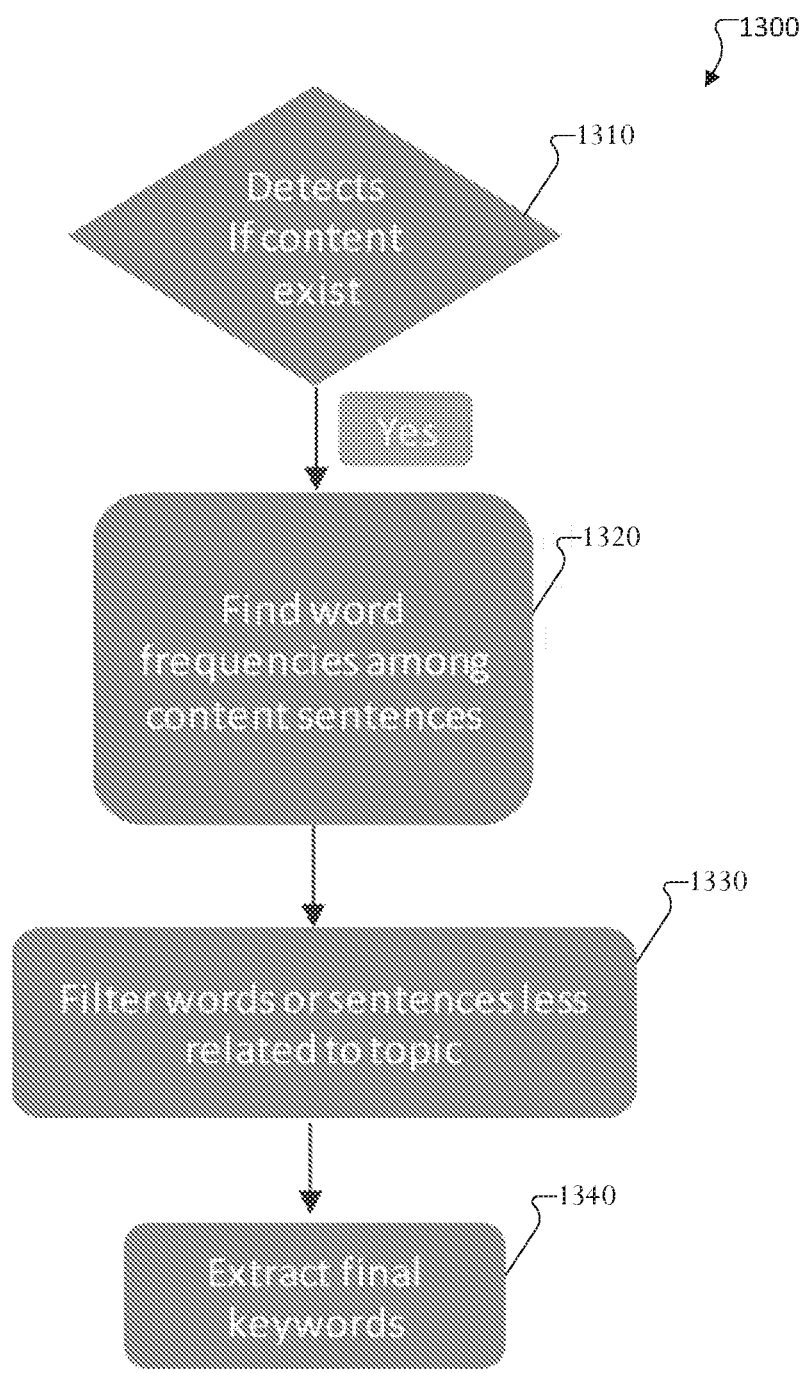
FIG. 13 illustrates operations of a process for keyword extraction based on file content.

FIG. 13 illustrates operations of a process 1300 for keyword extraction based on file content according to traditional means as can be performed by a processor. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the concurrence of intervening or intermediate steps. The process depicted in the example depicted can be implemented by a processor operating on a device.

In block 1310, the processor detects whether file content exists for a file. The file content being words or sentences and file metadata, such as, physical location, file creation time, and the like.

In block 1320, the processor, responsive to determining that file content exists for the file determines word frequencies among the file content.

In block 1330, the processor, filters the less relevant words or sentences based on word frequency.

Subsequently, the processor in block, 1340, extracts the final keywords. That is, the convention keyword extraction process does not extract keywords based on the similarity between content keywords and conversation keywords as described in the Applicant's application. Further, the convention keyword extraction process does not extract conversation keywords based on word frequency and filtering. Furthermore, convention keyword extraction process does not update keywords in response to detecting content updates or new conversations related to the re-uploading of a file.

Although the present disclosure has been described in conjunction with specific embodiments, it will be understood that it is not it is not the intention to limit the invention to the described embodiments. On the contrary, it is intended to cover alternatives, modifications, and equivalents as may be suggested to one skilled in the art as fall within the scope of the appended claims. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or computing devices. In addition, those of ordinary skill in the art will recognize that devices such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method for indexing a file with an intelligent assistant device, the method comprising:
    detecting, by an input interface in an electronic device, a conversation having at least one user;
    responsive to the detecting of the conversation having the at least one user, monitoring, by the electronic device, the conversation for a file associated with the conversation;
    responsive to identifying the file associated with the monitored conversation, mining, by the electronic device, the conversation for contextual keywords associated with the file;
    determining whether content keywords exist in the file;
    responsive to determining that the content keywords exist in the file, indexing, by the electronic device, the file separate from the conversation by marking the file with an index including the contextual keywords mined from the conversation; and
    in response to a query, searching for the file based on the index.

2. The method of claim 1, wherein the mining the conversation comprises:
    responsive to an existence of the content keywords, identifying content keywords matching the contextual keywords;
    detecting frequencies of the matching content keywords; and
    filtering less relevant contextual keywords based on the detected frequencies.

3. The method of claim 2, further comprising:
    detecting an existence of another conversation associated with the file;
    responsive to the existence of the other conversation, mining the other conversation for additional contextual keywords associated with the file;
    updating the index for the file with the additional contextual keywords mined from the other conversation; and
    filtering the less relevant contextual keywords from the index based on whether they appear in the other conversation.

4. The method of claim 1, wherein the mining of the conversation comprises:
    in response to no content keywords existing, detecting frequencies of the contextual keywords; and
    filtering less relevant contextual keywords based on the detected frequencies.

5. The method of claim 4, further comprising:
    detecting an existence of content keywords in an update to the file;
    responsive to the existence of the content keywords in the update to the file, mining the conversation for additional contextual keywords associated with the file; and
    indexing the additional contextual keywords to the file.

6. The method of claim 1, further comprising:
sending the index to a cloud database, wherein the file is accessible via a third-party application; and
sending content of the file to a local device.

7. The method of claim 1, wherein the detecting of the conversation comprises detecting speech from the at least one user.

8. The method of claim 1, wherein the indexing comprises updating the file with metadata based on the contextual keywords mined from the conversation.

9. A computer program product residing on a non-transitory computer-readable storage medium having a plurality of instructions stored thereon, which, when executed by a processor, cause the processor to:
detect, via an input interface, a conversation having at least one user;
responsive to the detecting of the conversation having the at least one user, monitor the conversation for a file associated with the conversation;
responsive to identifying the file associated with the monitored conversation, mine the conversation for contextual keywords associated with the file;
determine whether content keywords exist in the file;
responsive to determining that the content keywords exist in the file, index the file separate from the conversation by marking the file with an index including the contextual keywords mined from the conversation; and
in response to a query, search for the file based on the index.

10. The computer program product of claim 9, wherein the instructions that when executed cause the processor to mine the conversation comprise instructions that when executed cause the processor to:
responsive to an existence of the content keywords, identify content keywords matching the contextual keywords;
detect frequencies of the matching content keywords; and
filter less relevant contextual keywords based on the detected frequencies.

11. The computer program product of claim 10, further comprising instructions that when executed cause the processor to:
detect an existence of the other conversation associated with the file;
responsive to the existence of the other conversation, mine the other conversation for additional contextual keywords associated with the file;
update the index for the file with the additional contextual keywords mined from the other conversation; and
filter the less relevant contextual keywords from the index based on whether they appear in the other conversation.

12. The computer program product of claim 9, wherein the instructions that when executed cause the processor to mine the conversation comprise instructions that when executed cause the processor to:
in response to no content keywords existing, detect frequencies of the contextual keywords; and
filter less relevant contextual keywords based on the detected frequencies.

13. The computer program product of claim 12, further comprising instructions that when executed cause the processor to:
detect an existence of content keywords in an update to the file;
responsive to the existence of the content keywords in the update to the file, mine the conversation for additional contextual keywords associated with the file; and
index the additional contextual keywords to the file.

14. The computer program product of claim 9, further comprising instructions that when executed cause the processor to:
send the index to a cloud database, wherein the file is accessible via a third-party application; and
send content of the file to a local device.

15. An intelligent assistant device for conversation-based indexing and searching of a file, the intelligent assistant device comprising:
an interface configured to detect a conversation having at least one user; and
a processor configured to:
responsive to the detecting the conversation having the at least one user, monitor the conversation for a file associated with the conversation;
responsive to identifying the file associated with the monitored conversation, mine the conversation for contextual keywords associated with the file;
determine whether content keywords exist in the file;
responsive to determining that the content keywords exist in the file, index the file separate from the conversation by marking the file with an index including the contextual keywords mined from the conversation; and
in response to a query, search for the file based on the index.

16. The intelligent assistant device of claim 15, wherein, to mine the conversation, the processor is configured to:
responsive to an existence of the content keywords, identify content keywords matching the contextual keywords;
detect frequencies of the matching content keywords; and
filter less relevant contextual keywords based on the detected frequencies.

17. The intelligent assistant device of claim 16, wherein the processor is further configured to:
detect an existence of another conversation associated with the file;
responsive to the existence of the other conversation, mine the other conversation for additional contextual keywords associated with the file;
update the index for the file with the additional contextual keywords mined from the other conversation; and
filter the less relevant contextual keywords from the index based on whether they appear in the other conversation.

18. The intelligent assistant device of claim 15, wherein, to mine the conversation, the processor is configured to:
in response to no content keywords existing, detect frequencies of the contextual keywords; and
filter less relevant contextual keywords based on the detected frequencies.

19. The intelligent assistant device of claim 18, wherein the processor is further configured to:
detect an existence of content keywords in an update to the file;
responsive to the existence of the content keywords in the update to the file, mine the conversation for additional contextual keywords associated with the file; and
index the additional contextual keywords to the file.

20. The intelligent assistant device of claim 15, wherein the processor is further configured to:
send the index to a cloud database, wherein the file is accessible via a third-party application; and
send content of the file to a local device.

* * * * *